USO10604111B2

United States Patent
Nishikawa et al.

(10) Patent No.: US 10,604,111 B2
(45) Date of Patent: Mar. 31, 2020

(54) VEHICLE CONTROL APPARATUS, VEHICLE CONTROL METHOD, AND RECORDING MEDIUM STORING PROGRAM

(71) Applicant: Panasonic Intellectual Property Corporation of America, Torrance, CA (US)

(72) Inventors: Tsuyoki Nishikawa, Osaka (JP); Daijiroh Ichimura, Hyogo (JP); Misaki Tsujikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/038,209

(22) Filed: Jul. 18, 2018

(65) Prior Publication Data

US 2019/0039564 A1 Feb. 7, 2019

Related U.S. Application Data

(60) Provisional application No. 62/540,837, filed on Aug. 3, 2017.

(51) Int. Cl.
*B60R 25/04* (2013.01)
*B60R 16/037* (2006.01)
(Continued)

(52) U.S. Cl.
CPC .......... *B60R 25/04* (2013.01); *B60R 16/0373* (2013.01); *B60R 25/23* (2013.01); *B60R 25/257* (2013.01); *G10L 15/07* (2013.01)

(58) Field of Classification Search
CPC ... B60R 24/04; B60R 16/0373; B60R 25/257; G10L 15/07

(Continued)

(56) References Cited

U.S. PATENT DOCUMENTS 10,341,863 B2 * 7/2019 Fontana
2006/0097844 A1 * 5/2006 Nakashima ............. B60R 25/25
340/5.52

(Continued)

FOREIGN PATENT DOCUMENTS

JP 2000-080828 3/2000
JP 2017-161825 9/2017

OTHER PUBLICATIONS

The Extended European Search Report dated Jan. 3, 2019 for the related European Patent Application No. 18186823.3.

*Primary Examiner* — Yazan A Soofi
(74) *Attorney, Agent, or Firm* — Greenblum & Bernstein, P.L.C.

(57) ABSTRACT

A vehicle control apparatus includes a start information acquisition unit that acquires start information including detection information about a key to a vehicle and a start instruction to start an engine, a first authentication unit that acquires, in accordance with the start information, sensing information about a user detected by a sensor of the vehicle and information about a preregistered user corresponding to the sensing information and authenticates whether the detected user is the preregistered user, a second authentication unit that acquires, in accordance with the start information, authentication information input by the user and preregistered authentication information corresponding to the authentication information and authenticates whether the input authentication information is the same as the preregistered authentication information, and a control information output unit that outputs control information regarding start of the engine based on at least one of the authentication results received from the first and second authentication units.

13 Claims, 14 Drawing Sheets

(51) Int. Cl.
*B60R 25/25* (2013.01)
*G10L 15/07* (2013.01)
*B60R 25/23* (2013.01)

(58) Field of Classification Search
USPC .......................................................... 701/36
See application file for complete search history.

(56) References Cited

U.S. PATENT DOCUMENTS

| | | | |
|---|---|---|---|
| 2007/0000712 A1* | 1/2007 | Kamiya | B60R 25/02153 180/287 |
| 2015/0363986 A1* | 12/2015 | Hoyos | H05K 999/99 340/5.61 |
| 2016/0311400 A1* | 10/2016 | Gennermann | B60R 25/2018 |
| 2017/0263257 A1 | 9/2017 | Tsujikawa | |
| 2018/0361991 A1* | 12/2018 | Mitsubayashi | B60R 25/24 |
| 2019/0001926 A1* | 1/2019 | Arakawa | B60R 25/241 |
| 2019/0147678 A1* | 5/2019 | Saiki | B60R 25/24 |
| 2019/0266562 A1* | 8/2019 | Kanaoka | G06Q 10/0836 |

* cited by examiner

VEHICLE CONTROL APPARATUS, VEHICLE CONTROL METHOD, AND RECORDING MEDIUM STORING PROGRAM

BACKGROUND

1. Technical Field

The present disclosure relates to a vehicle control apparatus, a vehicle control method, and a recording medium storing a program.

2. Description of the Related Art

An engine key or a remote control key has been used for locking and unlocking a door of a vehicle, opening and closing a door, and the like. If such a key is lost, someone else may find the key and, thus, the vehicle may be stolen. For example, Japanese Unexamined Patent Application Publication No. 2000-80828 describes a vehicle control apparatus that performs control of various parts of a vehicle, such as door locking and unlocking, trunk opening, and headlight turning on and off, in accordance with a voice instruction emitted by a user. The vehicle control apparatus performs voice recognition on the voice input to a microphone mounted in the vehicle on the basis of voice data for user verification and makes voiceprint verification based on voiceprint data for user verification. In this manner, the vehicle control apparatus determines whether the voice matches the voice of a preregistered user.

SUMMARY

In one general aspect, the techniques disclosed here feature a vehicle control apparatus mounted in a vehicle. The vehicle control apparatus includes an acquisition unit that acquires start information including detection information about a key to the vehicle and a start instruction to start an engine of the vehicle, a first authentication unit that acquires, in accordance with the acquired start information, sensing information about a user detected by a sensor of the vehicle and information about a preregistered user corresponding to the sensing information and authenticates whether the detected user is the preregistered user, a second authentication unit that acquires, in accordance with the acquired start information, authentication information input by the user and preregistered authentication information corresponding to the authentication information and authenticates whether the input authentication information is the same as the preregistered authentication information, and a control information output unit that outputs control information regarding start of the engine on a basis of at least one of a result of authentication performed by the first authentication unit and a result of authentication performed by the second authentication unit.

According to the vehicle control apparatus or the like of the present disclosure, the security of the vehicle can be increased, and unavailability of the vehicle can be reduced.

It should be noted that general or specific embodiments may be implemented as a system, an apparatus, a method, an integrated circuit, a computer program, a computer-readable storage medium, such as a recording disc, or any selective combination thereof. Examples of the computer-readable storage medium include a nonvolatile recording medium, such as a compact disc-read only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
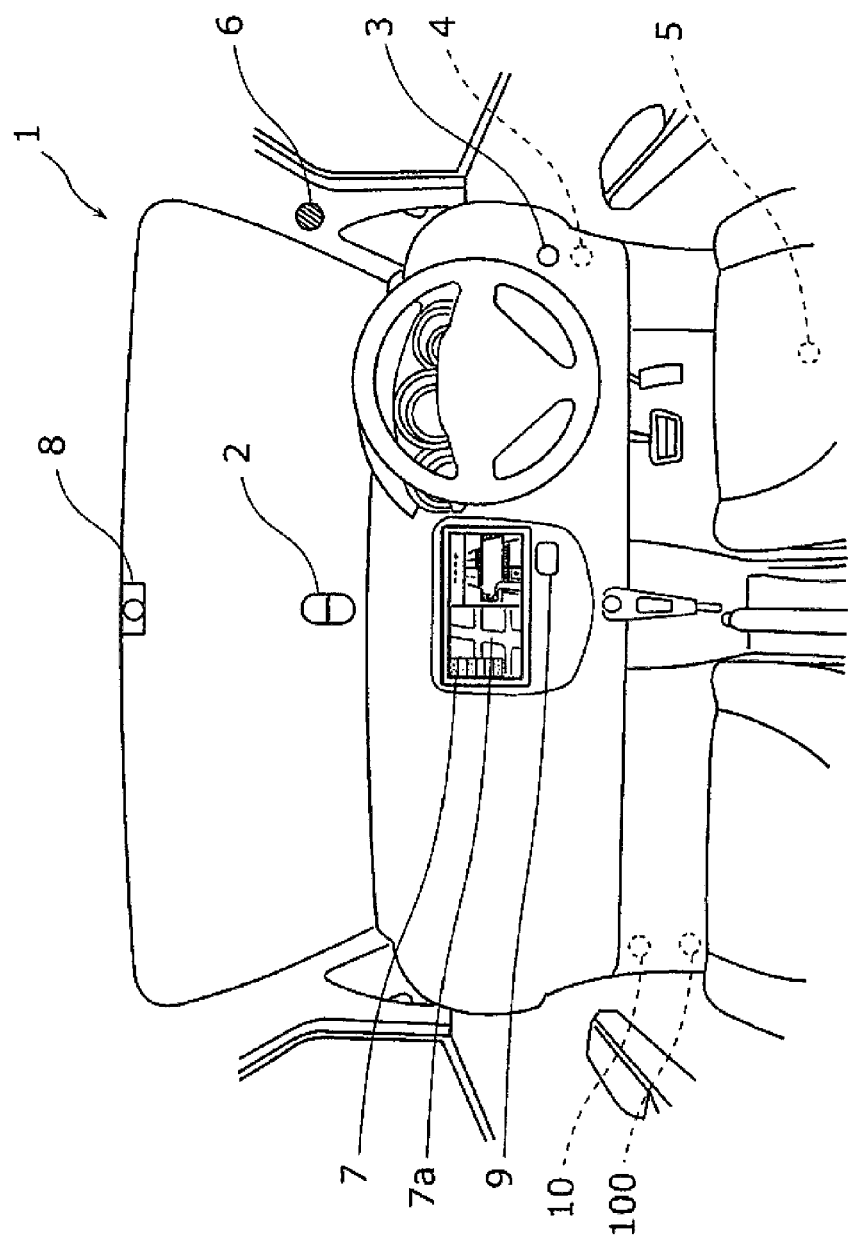
FIG. 1 is a schematic illustration of an example of the vehicle interior of a vehicle having a vehicle control apparatus mounted therein according to a first embodiment.

The vehicle control apparatus described in Japanese Unexamined Patent Application Publication No. 2000-80828 increases the security of a vehicle by using voice recognition. However, in the vehicle control apparatus disclosed in Japanese Unexamined Patent Application Publication No. 2000-80828, even when the voice is the voice produced by the preregistered user, voice authentication may not work due to a change in the voice caused by the physical conditions and the influence of the surrounding noise or the like. In such a case, the user cannot drive the vehicle, that is, the vehicle becomes unusable.

The present disclosure provides a vehicle control apparatus, a vehicle control method, and a recording medium storing a program that increase the vehicle security and reduce unavailability of a vehicle.

As described above in "Description of the Related Art" section, in order to increase the security of the vehicle against unauthorized use of an engine key or a remote control key by someone else, the present inventors studied the above-described technology and found that for example, the case in which even a preregistered user was not successfully authenticated occurred according to the technology described in Japanese Unexamined Patent Application Publication No. 2000-80828 mentioned in "Description of the Related Art" section. Examples of such a case include the case in which the voice of the preregistered user changes due to the physical conditions of the user and the case in which surrounding noise is mixed into the voice of the user and is input to a microphone. In this case, even when the user performs an operation for authentication, the user is not successfully authorized and, thus, cannot use the vehicle. To solve such a problem, the present inventors have developed a technology to enable the user to use a vehicle while increasing the security of the vehicle against unauthorized use of the key even when authentication of a preregistered user fails. The technology is described below.

For example, according to an aspect of the present disclosure, a vehicle control apparatus mounted in a vehicle is provided. The vehicle control apparatus includes an acquisition unit that acquires start information including detection information about a key to the vehicle and a start instruction to start an engine of the vehicle, a first authentication unit that acquires, in accordance with the acquired start information, sensing information about a user detected by a sensor of the vehicle and information about a preregistered user corresponding to the sensing information and authenticates whether the detected user is the preregistered user, a second authentication unit that acquires, in accordance with the acquired start information, authentication information input by the user and preregistered authentication information corresponding to the authentication information and authenticates whether the input authentication information is the same as the preregistered authentication information, and a control information output unit that outputs control information regarding start of the engine on a basis of at least one of a result of authentication performed by the first authentication unit and a result of authentication performed by the second authentication unit.

According to the above aspect, the vehicle control apparatus can perform authentication based on the sensing information about the user by using the first authentication unit and authentication based on the input authentication information by using the second authentication unit. In addition, the vehicle control apparatus outputs control information to start the engine on the basis of an authentication result received from at least one of the first authentication unit and the second authentication unit. Thus, even when authentication performed by one of the first authentication unit and the second authentication unit fails, the vehicle control apparatus can output the control information by using the result of the other authentication. In this manner, the vehicle control apparatus can increase the security of the vehicle and reduce unavailability of the vehicle. In particular, due to the conditions of the user, such as a physical condition, the authentication based on the sensing information about the user may fail even when the user is registered in advance. However, since authentication using the input authentication information can be performed, wrong authentication of a preregistered user can be reduced.

According to the present aspect, the vehicle control apparatus may further include a first storage unit that stores the information about a preregistered user corresponding to the sensing information and a second storage unit that stores the preregistered authentication information corresponding to the authentication information. The first authentication unit may acquire the information about the preregistered user from the first storage unit, and the second authentication unit may acquire the preregistered authentication information from the second storage unit.

According to the above aspect, since the vehicle control apparatus includes the first storage unit and the second storage unit, the information stored in the first storage unit and the second storage unit can be protected from being tampered with from the outside.

According to the above aspect of the present disclosure, the control information output unit may output the control information to start the engine if at least one of authentication performed by the first authentication unit and authentication performed by the second authentication unit is successful.

According to the above aspect, a user who uses the vehicle can start the engine by using any one of the authentication performed by the first authentication unit and the authentication performed by the second authentication unit.

According to the above aspect of the present disclosure, if authentication performed by the first authentication unit fails, authentication by the second authentication unit may be performed.

According to the above aspect, authentication based on the sensing information about the user performed by the first authentication unit is more simplified than authentication based on the input authentication information performed by the second authentication unit. However, the authentication accuracy is lower. By performing simplified authentication by the first authentication unit first, the necessary operation performed by the user for authentication is reduced. Furthermore, by increasing the accuracy of authentication to be subsequently performed, the security level is increased.

According to the above aspect of the present disclosure, the start instruction may indicate that an accessory power supply of the vehicle is in an on mode.

According to the above aspect, authentication performed by the vehicle control apparatus is incorporated into a series of operations performed by the user to start the engine. Therefore, smooth authentication processing can be provided.

According to the above aspect of the present disclosure, the start instruction may indicate that a user is sitting on a driver's seat of the vehicle.

According to the above aspect, the user can start the engine without depressing the start button. As a result, the operation performed by the user to start the engine can be simplified.

According to the above aspect of the present disclosure, the vehicle control apparatus may further include a first authentication presentation unit that presents that authentication by the first authentication unit is performed and a second authentication presentation unit that presents that authentication by the second authentication unit is performed.

According to the above aspect, activation of a device for authentication using the first authentication unit and activation of a device for authentication using the second authentication unit are performed after presentation given by the first authentication presentation unit and presentation given by the second authentication presentation unit, respectively. In this manner, information unnecessary for authentication is not acquired by the devices for authentication. As a result, the authentication accuracy is increased.

According to the above aspect of the present disclosure, the first authentication unit may acquire voice of a user input via a microphone of the vehicle as the sensing information, acquire voice information of the preregistered user as the information about the preregistered user, and authenticate whether the user who uttered the voice is a preregistered user on a basis of similarity between the voice and the voice information.

According to the above aspect, authentication by the first authentication unit is performed by using the voice uttered by a user who uses the vehicle. Thus, the operation performed by the user for authentication is simplified.

According to the above aspect of the present disclosure, the first authentication unit may perform authentication on the basis of a degree of coincidence between text acquired by speech-recognizing the voice and text included in the voice information about the preregistered user.

According to the above aspect, authentication by the first authentication unit is performed by using text included in the voice uttered by a user who uses the vehicle. The text is extracted by performing a speech recognition process on the voice signal. This process can be performed with relatively low processing load. As a result, the processing speed of the vehicle control apparatus can be increased.

According to the above aspect of the present disclosure, the first authentication unit may perform the authentication on the basis of similarity between a feature acquired from the voice and a feature of voice included in the voice information about the preregistered user.

According to the aspect, the authentication by the first authentication unit is performed by using the feature included in the voice uttered by the user who uses the vehicle. That is, in the authentication by the first authentication unit, a speaker who uttered the voice is identified, and it is authenticated whether the speaker matches the preregistered user. As a result, the authentication accuracy of the user increases, that is, the security is increased.

According to the above aspect of the present disclosure, the first authentication unit may perform the authentication based on the degree of coincidence between text acquired by speech-recognizing the voice and text included in the voice information of the preregistered user and perform the authentication based on the similarity between a feature acquired from the voice and a feature of voice included in the voice information of the preregistered user. If the two authentication attempts are successful, the first authentication unit may authenticate that the user who uttered the voice is a preregistered user.

According to the above aspect, authentication by the first authentication unit is performed by using text and the feature included in voice uttered by a user who uses the vehicle. If the authentication using the text and the authentication using the feature are successful, then the authentication by the first authentication unit is successful. As a result, the security is increased.

According to the above aspect of the present disclosure, the vehicle control apparatus may further include an identification unit that acquires voice of a user input via a microphone of the vehicle and identifies whether the user who uttered the voice falls in an elderly group and a support unit that outputs information used to support a user in the elderly group with a driving operation in accordance with a result of the identification performed by the identification unit.

According to the above aspect, in addition to performing authentication whether the user who uses the vehicle is a preregistered user, the age group of the user who uses the vehicle is identified. Thus, the vehicle control apparatus can support the driving operation performed by the user in accordance with the identified age group.

According to an aspect of the present disclosure, a vehicle control method includes acquiring start information including detection information about a key to a vehicle and a start instruction to start an engine of the vehicle, acquiring, in accordance with the acquired start information, sensing information about a user detected by a sensor of the vehicle and information about a preregistered user corresponding to the sensing information, performing first authentication to verify whether the detected user is the preregistered user, acquiring, in accordance with the acquired start information, authentication information input by the user and preregistered authentication information corresponding to the authentication information, performing second authentication to verify whether the input authentication information is the same as the preregistered authentication information, and outputting control information regarding start of the engine on a basis of at least one of a result of the first authentication and a result of the second authentication.

According to the above aspect, effects the same as those of the vehicle control apparatus according to the aspect of the present disclosure can be provided.

According to an aspect of the present disclosure, a non-transitory recording medium storing a program that causes a computer to perform a process is provided. The process includes acquiring start information including detection information about a key to the vehicle and a start instruction to start an engine of the vehicle, acquiring, in accordance with the acquired start information, sensing information about a user detected by a sensor of the vehicle and information about a preregistered user corresponding to the sensing information, performing first authentication to verify whether the detected user is the preregistered user, acquiring, in accordance with the acquired start information, authentication information input by the user and preregistered authentication information corresponding to the authentication information, performing second authentication to verify whether the input authentication information is the same as the preregistered authentication information, and outputting control information regarding start of the engine on a basis of at least one of a result of the first authentication and a result of the second authentication.

According to the above aspect, effects the same as those of the vehicle control apparatus according to the aspect of the present disclosure can be provided.

It should be noted that general or specific embodiments may be implemented as a system, an apparatus, a method, an integrated circuit, a computer program, a computer-readable storage medium, such as a recording disc, or any selective combination thereof. Examples of a computer-readable storage medium include a nonvolatile recording medium, such as a CD-ROM. In addition, the apparatus may be composed of one or more apparatuses. When the apparatus is composed of two or more apparatuses, the two or more apparatuses may be disposed in one device or may be disposed separately in two or more separated devices. In the present specification and in the claims, an "apparatus" can mean not only one apparatus but also a system composed of a plurality of apparatuses.

A vehicle control apparatus and the like according to the present disclosure are described in detail below with reference to the accompanying drawings. It is to be noted that each of the embodiments below describes a general or specific example. A value, a shape, a constituent element, the positions and the connection form of the constituent elements, steps (processes), and the sequence of steps used in the embodiments are only examples and shall not be construed as limiting the scope of the present disclosure. In addition, among the constituent elements in the embodiments described below, the constituent element that does not appear in an independent claim, which has the broadest scope, is described as an optional constituent element. In addition, all the drawings are schematic and not necessarily to scale. Furthermore, the same reference numerals are used throughout the accompanying drawings to refer to substantially the same constituent elements, and duplicate descriptions may be eliminated or simplified.

First Embodiment

A vehicle control apparatus 100 according to the first embodiment is described below. In the following embodiment, the vehicle control apparatus 100 is mounted on a vehicle 1 having an engine that becomes startable when detecting radio waves emitted by a remote control key, and the vehicle control apparatus 100 controls the start of the engine. According to the present embodiment, the vehicle 1 is a vehicle having an engine, that is, an internal combustion engine mounted therein. In the vehicle 1, the vehicle control apparatus 100 itself may constitute an apparatus such as an electronic control unit (ECU), or the vehicle control apparatus 100 may be incorporated into an apparatus, such as an ECU, as a control circuit or the like.

1-1. Configuration of Vehicle

The configuration of a vehicle 1 provided with a vehicle control apparatus 100 according to the first embodiment is described below with reference to FIG. 1. FIG. 1 is a schematic illustration of an example of a vehicle interior of a vehicle 1 having the vehicle control apparatus 100 mounted therein according to the first embodiment. The vehicle 1 includes a remote control key 2 having communication capability, a communication device 4 that communicates with the remote control key 2, a start button 3 used to start the engine of the vehicle 1, the vehicle control apparatus 100, and an ECU 10. The term "ECU 10" collectively refers to a variety of ECUs included in the vehicle 1. The ECU 10 controls the parts of the vehicle including the engine. The remote control key 2 transmits weak radio waves even when no operation is input, and the communication device 4 receives the radio waves via an antenna disposed in the vehicle body or the vehicle interior. Upon receiving a radio signal from the remote control key 2 via the communication device 4, the ECU 10 unlocks the door, for example. In addition, when the ECU 10 receives a radio signal from the remote control key 2 and if the start button 3 in the vehicle interior is depressed, the ECU 10 turns on a power supply used to start the engine. In addition, the ECU 10 starts the engine under the control of the vehicle control apparatus 100. The power supply is also referred to as an "accessory power supply (ACC power supply)". When the accessory power supply enters an ON mode, the accessory power supply enables air conditioning equipment, in-vehicle infotainment (IVI) including a car audio and navigation system, and attachments of the vehicle, such as mirrors and windows, to operate, in addition to enabling the engine to start. The remote control key 2 described above is also referred to as a "smart key".

Furthermore, the vehicle 1 may include a seat sensor 5 for detecting someone sitting on the driver's seat. An example of the seat sensor 5 is a load sensor for detecting the load imposed on the seat. The ECU 10 acquires the load detected by the seat sensor 5 and detects the presence or absence of a person sitting on the driver's seat on the basis of the load. When the ECU 10 receives the radio signal of the remote control key 2 via the communication device 4 and detects someone sitting on the driver's seat, the ECU 10 may turn on the accessory power supply or start the engine even if the start button 3 receives no input.

In addition, the vehicle 1 includes, in the vehicle interior, a microphone 6 for acquiring sounds and a display device 7 for presenting various kinds of information. The microphone 6 is disposed in the vicinity of the driver's seat and acquires the voice of a person seated in the driver's seat. The display device 7 includes a display. The display device 7 may further include a loudspeaker. Examples of a display include a liquid crystal display (LCD) and an organic or inorganic electroluminescence (EL) display. The display device 7 visually and/or auditorily provides various kinds of information, such as information about the conditions of the vehicle 1, map and position information output by a navigation system, information about the conditions of a car audio system, and information about the conditions of an air conditioner. The display device 7 further includes an input interface 7a used by a person to input information. The input interface 7a may be integrated into the display device 7 or separately disposed. According to the present embodiment, the input interface 7a is integrated into the display of the display device 7. That is, the display is configured as a touch panel. However, the configuration of the present disclosure is not limited thereto.

Furthermore, the vehicle 1 may include a camera 8 and/or a fingerprint authentication sensor 9 in the vehicle interior. The camera 8 captures the image of the face of a person sitting on the driver's seat and acquires the image of the face. The fingerprint authentication sensor 9 acquires the image of a fingerprint of a person's finger in contact with the fingerprint authentication sensor 9. An example of the fingerprint authentication sensor 9 is a fingerprint sensor that converts a change in the electrical charge of an electrode caused by the unevenness of the fingerprint into an image.

The voice acquired by the microphone 6, the face image acquired by the camera 8, and the fingerprint image acquired by the fingerprint authentication sensor 9 can be used for authentication of a user who uses the vehicle 1. An authentication process is described in more detail below.

1-2. Configuration of Vehicle Control Apparatus

Figure 2:
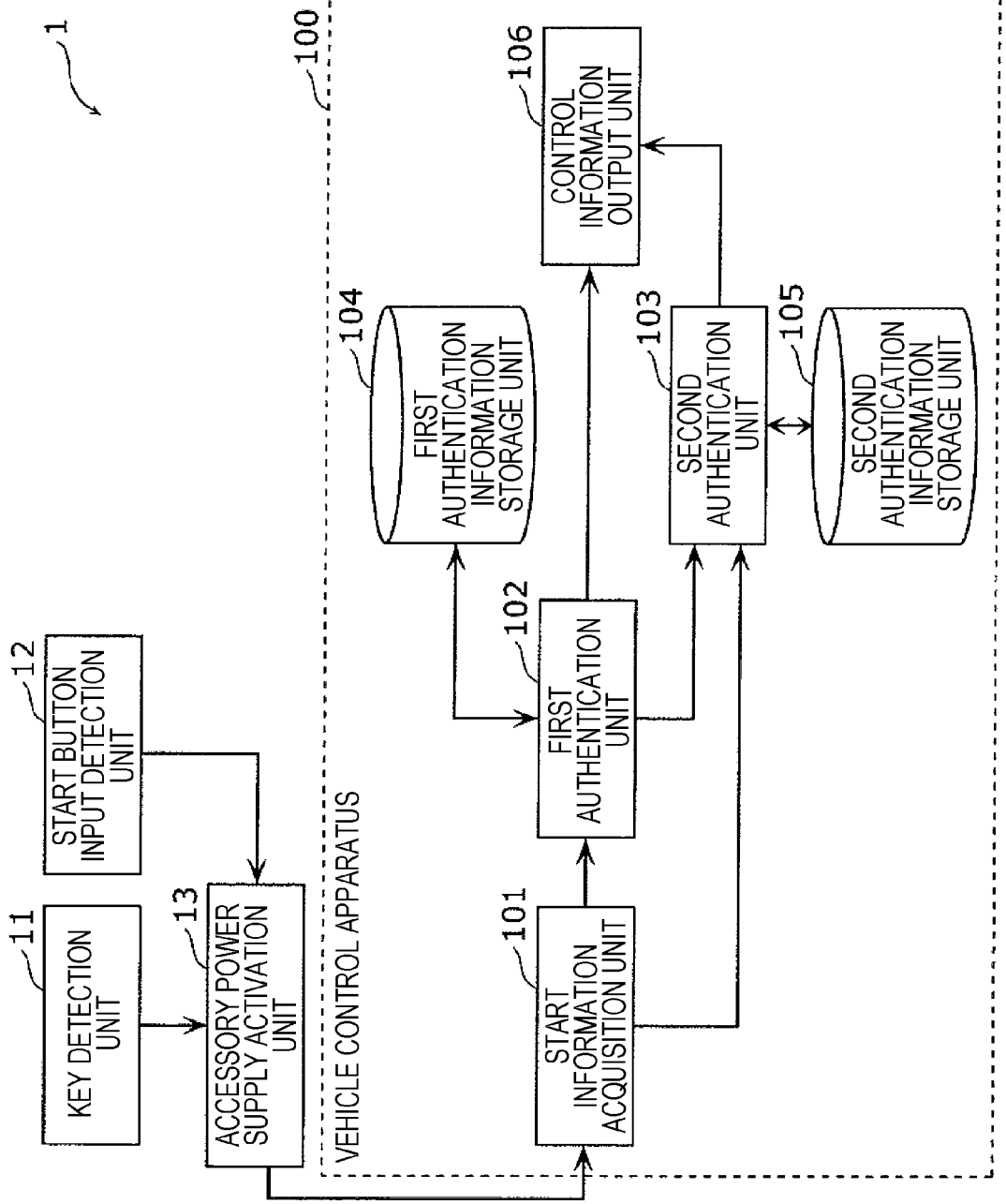
FIG. 2 is a block diagram of an example of the functional configuration of the vehicle control apparatus according to the first embodiment.

The configuration of the vehicle control apparatus 100 is described below. FIG. 2 is a block diagram of an example of the functional configuration of the vehicle control apparatus 100 according to the first embodiment. As illustrated in FIG. 2, the vehicle control apparatus 100 includes a start information acquisition unit 101, a first authentication unit 102, a second authentication unit 103, a first authentication information storage unit 104, a second authentication information storage unit 105, and a control information output unit 106.

Each of the constituent elements of the vehicle control apparatus 100 (that is, the start information acquisition unit 101, the first authentication unit 102, the second authentication unit 103, and the control information output unit 106) may be configured as a computer system (not illustrated) including a processor, such as a central processing unit (CPU) or a digital signal processor (DSP), and memories, such as a random access memory (RAM) and a read-only memory (ROM). The functions of some or all of the constituent elements may be provided by the CPU or the DSP executing a program recorded in the ROM by using the RAM as a work memory. Alternatively, the functions of some or all of the constituent elements may be provided by dedicated hardware circuits, such as electronic circuits or integrated circuits. Still alternatively, the functions of some or all of the constituent elements may be provided by a combination of the above-described software function and hardware circuit. The program may be an application program provided by communication via a communication network, such as the Internet, communication in accordance with a mobile communication standard, or communication via a wireless network, a wired network, or broadcast.

The first authentication information storage unit 104 and the second authentication information storage unit 105 store information for authenticating a user who uses the vehicle 1. The information stored in the first authentication information storage unit 104 and the second authentication information storage unit 105 is described in detail below. Each of the first authentication information storage unit 104 and the second authentication information storage unit 105 is composed of a storage device, such as a semiconductor memory (e.g., a ROM, a RAM, or a flash memory), a hard disk drive, or a solid state drive (SSD). According to the present embodiment, the first authentication information storage unit 104 and the second authentication information storage unit 105 are included in the vehicle control apparatus 100 and are mounted in the vehicle 1. However, the configuration is not limited thereto. At least one of the first authentication information storage unit 104 and the second authentication information storage unit 105 need not be mounted in the vehicle 1 and may be provided in a server device (not illustrated) located remote from the vehicle 1. In this case, the vehicle control apparatus 100 may wirelessly communicate with the server device via a communication device (not illustrated) and acquire necessary information from the first authentication information storage unit 104 and/or the second authentication information storage unit 105. Wireless communication may be performed over a wireless local area network (LAN) via a communication network, such as the Internet. Note that the first authentication information storage unit 104 and the second authentication information storage unit 105 are examples of a first storage unit and a second storage unit, respectively.

The start information acquisition unit 101 acquires start information from a key detection unit 11, a start button input detection unit 12, and an accessory power supply activation unit 13 included in the vehicle 1. The start information includes detection information of the remote control key 2 of the vehicle 1 and a start instruction of the engine of the vehicle 1. The start information acquisition unit 101 outputs the start information to the first authentication unit 102 and the second authentication unit 103. The start information acquisition unit 101 is an example of an acquisition unit.

The configurations of the key detection unit 11, the start button input detection unit 12, and the accessory power supply activation unit 13 are described below. The key detection unit 11 detects that the remote control key 2 is present in a predetermined area by receiving a radio wave signal emitted from the remote control key 2 via the communication device 4 disposed in the vehicle interior. An example of the predetermined area is an area in the vehicle interior. Upon detecting the remote control key 2, the key detection unit 11 outputs the result of detection to the accessory power supply activation unit 13 as detection information of the remote control key 2.

If the start button 3 is depressed by the user who uses the vehicle 1, the start button input detection unit 12 receives an input signal from the start button 3. Upon receiving the input signal from the start button 3, the start button input detection unit 12 outputs, to the accessory power supply activation unit 13, the information indicating that the start button 3 is turned on as turn-on information of the start button 3. The turn-on information of the start button 3 includes the start instruction to start the engine of the vehicle 1.

If, after acquiring the detection information of the remote control key 2, the accessory power supply activation unit 13 receives the turn-on information of the start button 3, the accessory power supply activation unit 13 turns on the accessory power supply. In addition, the accessory power supply activation unit 13 outputs the detection information of the remote control key 2 and an instruction to start the engine of the vehicle 1 to the start information acquisition unit 101. The accessory power supply activation unit 13 may output, to the start information acquisition unit 101, information indicating that the accessory power supply is turned on as an instruction to start the engine.

Each of the configurations of the key detection unit 11, the start button input detection unit 12, and the accessory power supply activation unit 13 may be any one of the configurations described above for the constituent elements of the start information acquisition unit 101 and the like of the vehicle control apparatus 100. The key detection unit 11, the start button input detection unit 12, and the accessory power supply activation unit 13 may be included in the ECU 10, or ECUs for starting the engine may be separately provided.

Communication between the ECU 10, the key detection unit 11, the start button input detection unit 12, the accessory power supply activation unit 13, and the vehicle control apparatus 100 may be any type of communication. An example of such communication is communication via an in-vehicle network, such as Controller Area Network (CAN).

Figure 3:
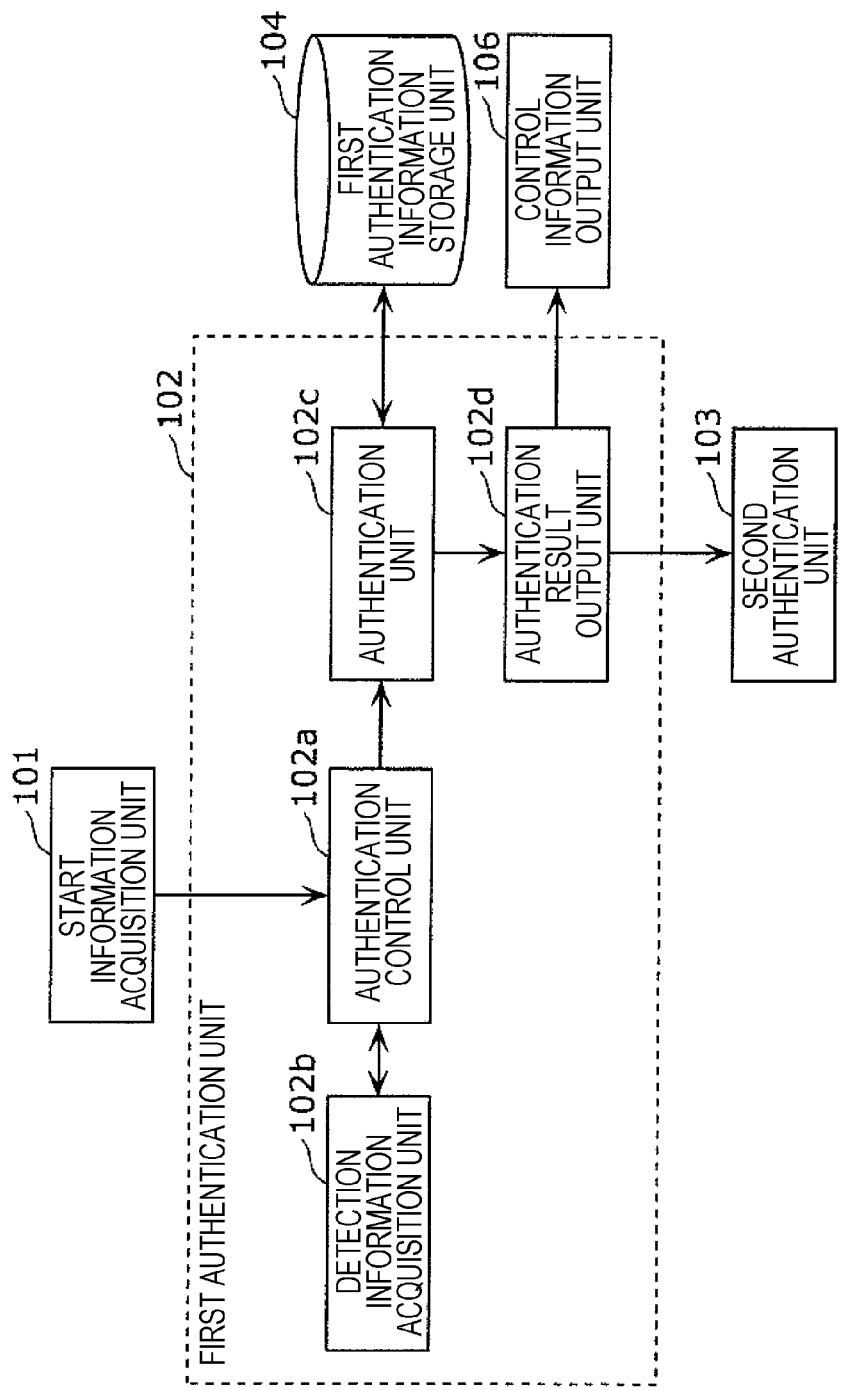
FIG. 3 is a block diagram of an example of the functional configuration of a first authentication unit of the vehicle control apparatus according to the first embodiment.

As illustrated in FIGS. 2 and 3, the first authentication unit 102 of the vehicle control apparatus 100 includes an authentication control unit 102a, a detection information acquisition unit 102b, an authentication unit 102c, and an authentication result output unit 102d. FIG. 3 is a block diagram of an example of the functional configuration of the first authentication unit 102 of the vehicle control apparatus 100 according to the first embodiment. The authentication control unit 102a receives the start information from the start information acquisition unit 101. Upon receiving the start information, the authentication control unit 102a causes the detection information acquisition unit 102b to sense the user of the vehicle 1 using the sensor of the vehicle 1 and acquire the physical information of the user as sensing information. Hereinafter, the physical information of the user is also referred to as "sensing physical information". In this manner, the first authentication unit 102 acquires the sensing information about the user detected by the sensor of the vehicle 1 in accordance with the acquired start information.

Examples of the sensor of the vehicle 1 include the microphone 6, the camera 8, and the fingerprint authentication sensor 9. The physical information about the user sensed by the microphone 6 is information about the user's voice collected by the microphone 6. The physical information about the user sensed by the camera 8 is the face image or the iris image of the eye of the user in the image captured by the camera 8. The physical information about the user sensed by the fingerprint authentication sensor 9 is the fingerprint image of the user imaged by the fingerprint authentication sensor 9. The sensor of the vehicle 1, such as the microphone 6, the camera 8, or the fingerprint authentication sensor 9, constitutes a first authentication device.

When acquiring the user's voice, the detection information acquisition unit 102b may extract a text from the acquired voice by performing speech recognition and output the extracted text to the authentication control unit 102a as sensing physical information. Alternatively, the detection information acquisition unit 102b may extract the feature from the acquired voice and output the feature to the authentication control unit 102a as sensing physical information. The feature of the voice represents the feature of the user who produces the voice.

When acquiring the image of the user, the detection information acquisition unit 102b may extract the face area of the user from the image and output the image of the face area to the authentication control unit 102a as sensing physical information. Alternatively, the detection information acquisition unit 102b may extract the iris region of the user's eye from the image and output the image of the iris region to the authentication control unit 102a as sensing physical information.

In addition, the authentication control unit 102a outputs, to the authentication unit 102c, the sensing physical information acquired from the detection information acquisition unit 102b. The authentication unit 102c refers to physical information that is stored in the first authentication information storage unit 104 and that corresponds to the acquired sensing physical information (hereinafter, the physical information is also referred to as "registered physical information") and matches the sensing physical information with the registered physical information. Thereafter, the authentication unit 102c authenticates whether the user of the sensing physical information is a preregistered user on the basis of the degree of coincidence or the similarity between the sensing physical information and the registered physical information. If the sensing physical information and the registered physical information match or have a relationship indicating that the similarity is higher than or equal to a predefined similarity, the authentication unit 102c authenticates that the user of the sensing physical information is a preregistered user. That is, the authentication unit 102c determines that the authentication is successful. Otherwise, the authentication unit 102c determines that the user of the sensing physical information is not a preregistered user. That is, the authentication unit 102c determines that the authentication failed. As described above, the first authentication unit 102 acquires the registered physical information corresponding to the sensing physical information from the first authentication information storage unit 104 and authenticates whether the user of the sensing physical information is a preregistered user. The authentication unit 102c outputs the result of authentication to the authentication result output unit 102d, which outputs the result of authentication to the control information output unit 106 or the second authentication unit 103.

By using the sensor of the vehicle 1, the registered physical information is acquired in advance from users who can regularly use the vehicle, such as the owner of the vehicle 1 and a user whom the owner has permitted to use the vehicle 1. The registered physical information is stored in the first authentication information storage unit 104. Note that the registered physical information may be acquired by using a sensor outside the vehicle 1. Like the sensing physical information, examples of the registered physical information include information about the user's voice, the face image or the iris image of the eye of the user, and the fingerprint image of the user.

Figure 4:
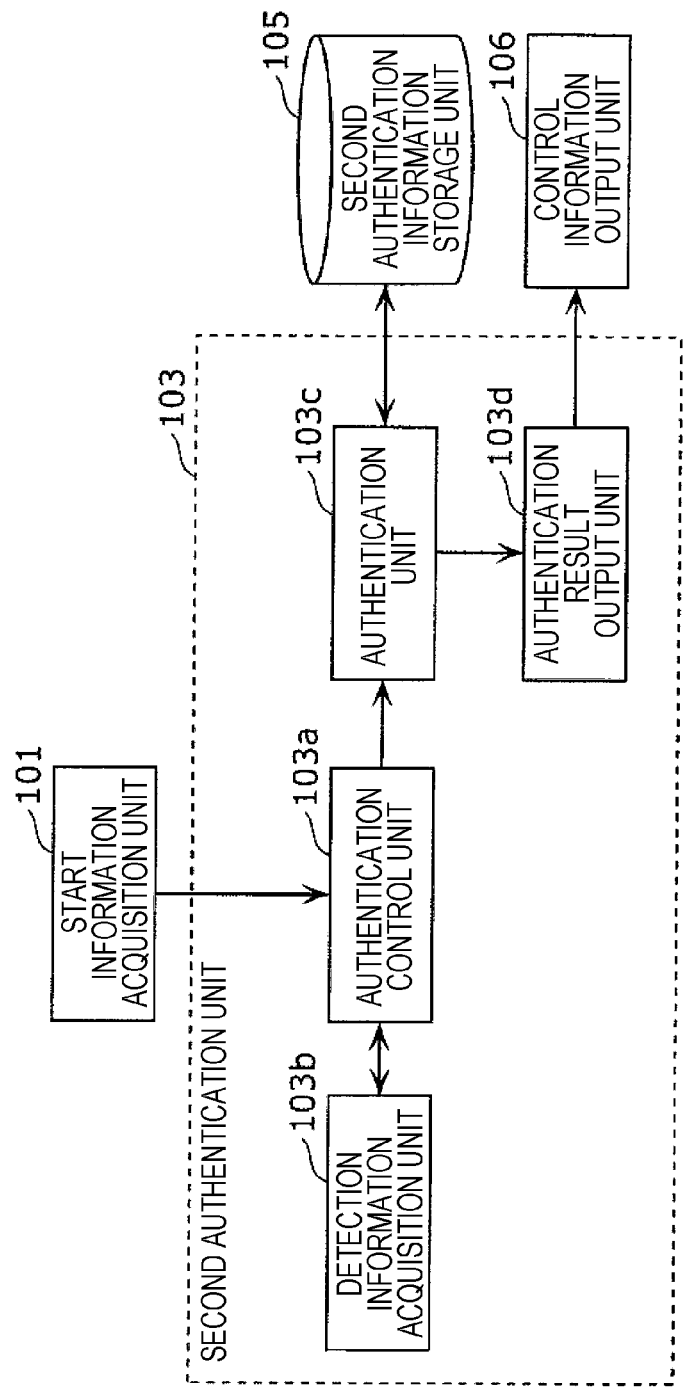
FIG. 4 is a block diagram of an example of the functional configuration of a second authentication unit of the vehicle control apparatus according to the first embodiment.

As illustrated in FIGS. 2 and 4, the second authentication unit 103 includes an authentication control unit 103a, a detection information acquisition unit 103b, an authentication unit 103c, and an authentication result output unit 103d. FIG. 4 is a block diagram of an example of the functional configuration of the second authentication unit 103 of the vehicle control apparatus 100 according to the first embodiment. The authentication control unit 103a receives the start information from the start information acquisition unit 101. Upon receiving the start information, the authentication control unit 103a causes the detection information acquisition unit 103b to enter a mode for accepting an input of authentication information via the input interface 7a of the display device 7, so that the detection information acquisition unit 103b waits for an input of authentication information. That is, the detection information acquisition unit 103b enters an input standby mode. An example of authentication information is a cryptography key, such as a personal identification number, a password, or the order in which the buttons are pressed.

When the authentication information is input, the detection information acquisition unit 103b outputs the authentication information (hereinafter also referred to as "input authentication information") to the authentication unit 103c via the authentication control unit 103a. The authentication unit 103c refers to the authentication information that is stored in the second authentication information storage unit 105 and that corresponds to the input authentication information (hereinafter, the authentication information is also referred to as "registered authentication information") and matches the input authentication information with the registered authentication information. Thereafter, the authentication unit 103c authenticates whether the input authentication information and the registered authentication information match on the basis of the degree of coincidence between the input authentication information and the registered authentication information. If the input authentication information and the registered authentication information match, the authentication unit 103c determines that the authentication is successful. Otherwise, the authentication unit 103c determines that the authentication failed. As described above, the second authentication unit 103 acquires, from the second authentication information storage unit 105, the registered authentication information corresponding to the input authentication information and authenticates whether the input authentication information and the registered authentication information match. The authentication unit 103c outputs the result of authentication to the authentication result output unit 103d, which outputs the result of authentication to the control information output unit 106. Note that the input interface 7a constitutes a second authentication device.

The registered authentication information is previously input by users who can regularly use the vehicle 1, such as the owner of the vehicle 1 and a user whom the owner has permitted to use the vehicle 1, through the input interface 7a. Thus, the registered authentication information is registered in the second authentication information storage unit 105. Note that the registered authentication information may be registered in the second authentication information storage unit 105 from a device outside the vehicle 1 via wireless or wired communication. The registered authentication information may be registered in advance by a car dealer or the like before delivery of the vehicle 1 to the user. Like the input authentication information, an example of registered authentication information is a cryptography key.

The control information output unit 106 outputs, to the ECU 10, the control information for starting the engine on the basis of at least one of the authentication result received from the first authentication unit 102 and the authentication result received from the second authentication unit 103. More specifically, when the control information output unit 106 acquires at least one of the result of successful authentication from the first authentication unit 102 and the result of successful authentication from the second authentication unit 103, the control information output unit 106 outputs, to the ECU 10, the control information that causes the engine to start. Accordingly, the ECU 10 starts the engine. In addition, upon acquiring the result of failed authentication from the first authentication unit 102 and the result of failed authentication from the second authentication unit 103, the control information output unit 106 outputs, to the ECU 10, control information that causes the engine not to start. As a result, the ECU 10 does not start the engine. In this case, the control information output unit 106 may display, to the user, information indicating that the authentication failed on the display device 7. Thereafter, the second authentication unit 103 may maintain the input standby mode to wait for an input of authentication information to the input interface 7a.

1-3. User Registration Operation Performed by Vehicle Control Apparatus

The operation performed by the vehicle control apparatus 100 to register user information in the first authentication information storage unit 104 and the second authentication information storage unit 105 is described below. Normally, the vehicle control apparatus 100 operates in an authentication mode in which the vehicle control apparatus 100 starts the engine in accordance with the result of authentication of the user who uses the vehicle 1. However, upon receiving an input in accordance with a predefined rule, the vehicle control apparatus 100 operates in a registration mode in which the vehicle control apparatus 100 registers user information in the first authentication information storage unit 104 and the second authentication information storage unit 105. The predefined rule may be any rule, such as a predetermined number of inputs to the start button 3 at a predetermined point in time, input of secret code to the input interface 7a, or input of secret code through an input device connected to a terminal (not illustrated).

Figure 5:
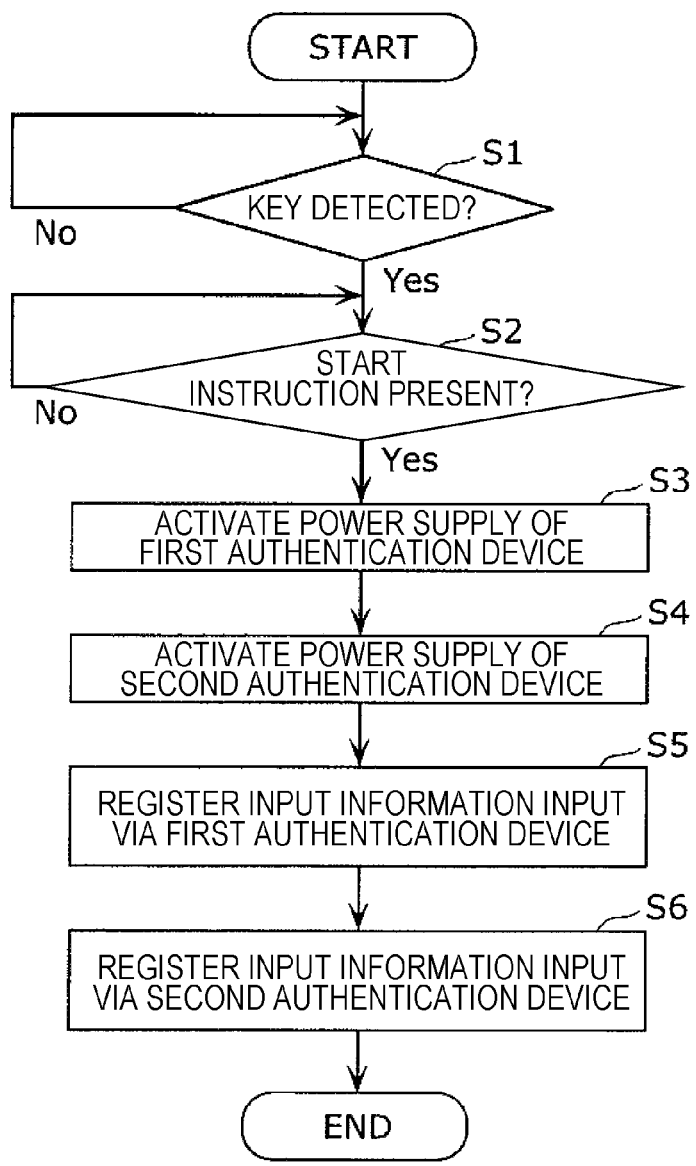
FIG. 5 is a flowchart illustrating an example of the flow of a user registration operation performed by the vehicle control apparatus according to the first embodiment.

FIG. 5 is a flowchart illustrating an example of the flow of the user registration operation performed by the vehicle control apparatus 100 according to the first embodiment. In FIG. 5, the operation performed by the vehicle control apparatus 100 in the registration mode is illustrated. As illustrated in FIG. 5, in step S1, the start information acquisition unit 101 determines whether detection information about the remote control key 2 can be acquired from the key detection unit 11. If the remote control key 2 can be acquired (Yes in step S1), the processing performed by the start information acquisition unit 101 proceeds to step S2. However, if the remote control key 2 cannot be acquired (No in step S1), the processing returns to step S1.

In step S2, the start information acquisition unit 101 determines whether an engine start instruction can be acquired from the start button input detection unit 12. If the start information acquisition unit 101 can acquire an engine start instruction (Yes in step S2), the processing proceeds to step S3. In this case, the accessory power supply activation unit 13 enters an ON mode from an OFF mode. However, if the start information acquisition unit 101 cannot acquire an engine start instruction (No in step S2), the processing returns to step S2.

In step S3, the first authentication unit 102 activates the power supply of the sensor of the vehicle 1, where the sensor serves as the first authentication device. The sensor of the vehicle 1 is one of the microphone 6, the camera 8, and the fingerprint authentication sensor 9.

Subsequently, in step S4, the second authentication unit 103 activates the power supply of the input interface 7a, which serves as a second authentication device, and the display device 7.

Subsequently, in step S5, the first authentication unit 102 causes the sensor of the vehicle 1 to sense the user and acquire the physical information of the user. Thereafter, the first authentication unit 102 stores the acquired physical information in the first authentication information storage unit 104, that is, registers the physical information. The registered physical information may be information about one user or information about a plurality of users.

Subsequently, in step S6, the second authentication unit 103 enters an input standby mode in which the second authentication unit 103 waits for an input of authentication information to the input interface 7a. When the authentication information is input to the input interface 7a, the second authentication unit 103 stores the input authentication information in the second authentication information storage unit 105, that is, the second authentication unit 103 registers the authentication information. In the input standby mode, the second authentication unit 103 may cause the display device 7 to output an image or a voice message prompting the user to input authentication information to the input interface 7a. Although only one kind of authentication information is registered, plural kinds of authentication information may be registered. After completion of the processing in step S6, the vehicle control apparatus 100 ends the operation thereof in the authentication mode.

Through the above-described processing in steps S1 to S6, the registered physical information and the registered authentication information are stored in the first authentication information storage unit 104 and the second authentication information storage unit 105, respectively. Note that the operation to store the registered physical information and the registered authentication information in the authentication mode may be performed when the vehicle 1 is delivered from a car dealer to the user or before delivery. In this case, after the delivery, the above-described processing may be performed in order to change the information.

Note that the order of steps S3 and S4 is not limited to the order illustrated in FIG. 5. The order of steps may be reversed. The order of steps S5 and S6 is not limited to the order illustrated in FIG. 5. The order of steps may be reversed.

1-4. User Authentication Operation Performed by Vehicle Control Apparatus

Figure 6:
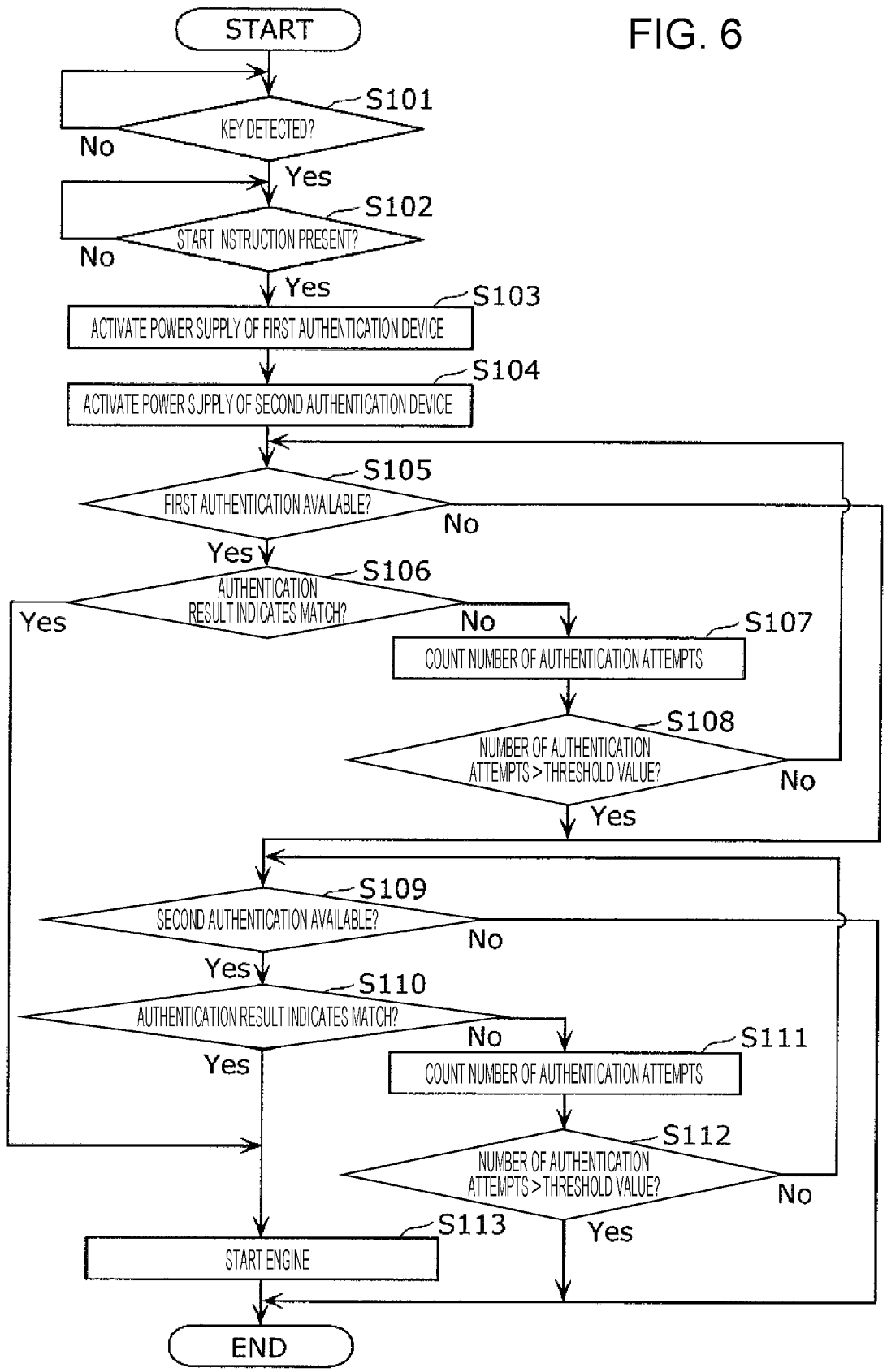
FIG. 6 is a flowchart illustrating an example of the flow of a user authentication operation performed by the vehicle control apparatus according to the first embodiment.

The user authentication operation performed by the vehicle control apparatus 100 at the time of starting the engine is described below. FIG. 6 is a flowchart illustrating an example of the flow of the user authentication operation performed by the vehicle control apparatus 100 according to the first embodiment. In FIG. 6, the operation performed by the vehicle control apparatus 100 in the authentication mode, which is a normal mode, is illustrated. In the authentication mode, the vehicle control apparatus 100 authenticates whether the user who intends to use the vehicle 1 matches a preregistered user.

As illustrated in FIG. 6, in step S101, the start information acquisition unit 101 determines whether detection information about the remote control key 2 can be acquired from the key detection unit 11. If detection information can be acquired (Yes in step S101), the processing performed by the start information acquisition unit 101 proceeds to step S102. However, if detection information cannot be acquired (No in step S101), the processing returns to step S101.

In step S102, the start information acquisition unit 101 determines whether to acquire an engine start instruction from the start button input detection unit 12. If the start information acquisition unit 101 can acquire an engine start instruction (Yes in step S102), the processing proceeds to step S103. In this case, the accessory power supply activation unit 13 enters an ON mode from an OFF mode. However, if the start information acquisition unit 101 cannot acquire an engine start instruction (No in step S102), the processing returns to step S102.

In step S103, the first authentication unit 102 activates the power supply of the sensor of the vehicle 1, where the sensor serves as the first authentication device. The sensor of the vehicle 1 is one of the microphone 6, the camera 8, and the fingerprint authentication sensor 9.

Subsequently, in step S104, the second authentication unit 103 activates the power supply of the input interface 7a, which serves as the second authentication device, and the display device 7.

Subsequently, in step S105, the first authentication unit 102 determines whether first authentication, which is authentication performed by the first authentication unit 102, is available. If the first authentication unit 102 can perform authentication (Yes in step S105), the processing proceeds to step S106. However, if the first authentication unit 102 cannot perform authentication (No in step S105), the processing proceeds to step S109. Note that, if the sensing physical information detected by the sensor can be acquired within a first predetermined period of time after activation of the sensor of the vehicle 1, the first authentication unit 102 determines that the first authentication is available. However, if the first authentication unit 102 cannot acquire the sensing physical information within the first predetermined period of time or if the first authentication unit 102 detects an input to the input interface 7a before acquiring the sensing physical information, the first authentication unit 102 determines that the first authentication is unavailable. To acquire sensing physical information is to acquire voice information input to the microphone 6, acquire an image captured by the camera 8, or acquire the image of a fingerprint input to the fingerprint authentication sensor 9.

In step S106, the first authentication unit 102 matches the acquired sensing physical information with the registered physical information in the first authentication information storage unit 104 and authenticates the sensing physical information. If the authentication of the sensing physical information is successful, that is, if the authentication result indicates a match (Yes in step S106), the first authentication unit 102 proceeds to step S113. However, if the authentication of the sensing physical information fails, that is, if the acquired sensing physical information and the registered physical information do not match (No in step S106), the first authentication unit 102 proceeds to step S107.

In step S107, the first authentication unit 102 counts the number of attempts of authentication of the sensing physical information performed after activation of the sensor of the vehicle 1, that is, the number of authentication processes performed. More specifically, the first authentication unit 102 adds "1" to the number of performed authentication processes retained before the process of step S106 performed most recently.

Subsequently, in step S108, the first authentication unit 102 determines whether the number of authentication processes of sensing physical information is greater than a first threshold value. The first threshold value is set in advance and is stored in the first authentication information storage unit 104, for example. If the number of authentication processes is less than or equal to the first threshold value (No in step S108), the first authentication unit 102 continues the authentication process of the sensing physical information. Thus, the processing returns to step S105, where new sensing physical information is acquired. In this case, if in step S105, new sensing physical information can be acquired within a second predetermined period of time after the most recent authentication process in step S106, the first authentication unit 102 determines that the first authentication is available. However, if new sensing physical information cannot be acquired within the second predetermined period of time after the most recent authentication process in step S106 or if an input to the input interface 7a is detected before new sensing physical information is acquired, the first authentication unit 102 determines that the first authentication is unavailable. The second predetermined period of time may be the same as or different from the first predetermined period of time. If the number of authentication processes exceeds the first threshold value (Yes in step S108), the processing performed by the first authentication unit 102 proceeds to step S109.

In step S109, the second authentication unit 103 determines whether second authentication, which is authentication performed by the second authentication unit 103, is available. If second authentication is available (Yes in step S109), the processing performed by the second authentication unit 103 proceeds to step S110. However, if second authentication is unavailable (No in step S109), the second authentication unit 103 ends the processing in the authentication mode. Note that if the input authentication information input to the input interface 7a can be acquired within a third predetermined period of time after the activation of the input interface 7a and the display device 7, the second authentication unit 103 determines that the second authentication is available. However, if the input authentication information cannot be acquired within the third predetermined period of time, the second authentication unit 103 determines that the second authentication is unavailable. The third predetermined period of time may be the same as one of the first predetermined period of time and the second predetermined period of time or may differ from each of the first predetermined period of time and the second predetermined period of time.

In step S110, the second authentication unit 103 matches the acquired input authentication information with the registered authentication information in the second authentication information storage unit 105 and performs authentication of the input authentication information. If the authentication of the input authentication information is successful, that is, if the authentication result indicates a match (Yes in step S110), the processing performed by the second authentication unit 103 proceeds to step S113. However, if the authentication of the input authentication information fails, that is, the input authentication information and the registered authentication information do not match (No in step S110), the processing proceeds to step S111.

In step S111, the second authentication unit 103 counts the number of attempts of authentication of the input authentication information performed after activation of the input interface 7a and the display device 7, that is, the number of authentication processes performed. More specifically, the second authentication unit 103 adds "1" to the number of performed authentication processes retained before the process of step S110 performed most recently.

Subsequently, in step S112, the second authentication unit 103 determines whether the number of authentication processes of the input authentication information is greater than a second threshold value. The second threshold value is set in advance and is stored in the second authentication information storage unit 105, for example. If the number of authentication processes is less than or equal to the second threshold value (No in step S112), the second authentication unit 103 continues the authentication process of the input authentication information. Thus, the processing returns to step S109, where new input authentication information is acquired. In this case, if in step S109, new input authentication information can be acquired within a fourth predetermined period of time after the most recent authentication process in step S110, the second authentication unit 103 determines that the second authentication is available. However, if new input authentication information cannot be acquired within the fourth predetermined period of time after the most recent authentication process in step S110, the second authentication unit 103 determines that the second authentication is unavailable. The fourth predetermined period of time may be the same as any one of the first predetermined period of time, the second predetermined period of time, and the third predetermined period of time or may differ from each of the first predetermined period of time, the second predetermined period of time, and the third predetermined period of time. However, if the number of performed authentication processes exceeds the second threshold value (Yes in step S112), the second authentication unit 103 ends the processing in the authentication mode.

In step S113, the control information output unit 106 outputs, to the ECU 10, control information to start the engine of the vehicle 1, since the control information output unit 106 acquired, from the first authentication unit 102 or the second authentication unit 103, the information indicating that the authentication is successful. As a result, the ECU 10 starts the engine.

As described above, the vehicle control apparatus 100 performs the second authentication if the first authentication is unavailable, if the first authentication fails, if the first authentication fails a number of times greater than the first threshold value, or if an input to the input interface 7a is detected before the first authentication is successful. Furthermore, if the second authentication is unavailable or if the second authentication fails a number of times greater than the second threshold value, the vehicle control apparatus 100 determines that the authentication of the user has failed. However, if either the first authentication or the second authentication is successful, the vehicle control apparatus 100 determines that the user authentication has succeeded.

1-5. Effects

As described above, according to the first embodiment, the vehicle control apparatus 100 includes the start information acquisition unit 101 that acquires start information including key detection information of the vehicle 1 and an engine start instruction of the vehicle 1, the first authentication unit 102 that acquires sensing information about a user detected by the sensor of the vehicle 1 and user information that is registered in advance and that corresponds to the sensing information and authenticates whether the detected user is a preregistered user in accordance with the start information, the second authentication unit 103 that acquires authentication information input by a user and authentication information that is registered in advance and that corresponds to the authentication information in accordance with the acquired start information and authenticates whether the input authentication information is the same as the preregistered authentication information, and the control information output unit 106 that outputs control information to start the engine on the basis of at least one of the result of authentication performed by the first authentication unit 102 and the result of authentication performed by the second authentication unit 103.

According to the above-described configuration, the vehicle control apparatus 100 can perform authentication regarding the sensing information about the user by using the first authentication unit 102 and authentication regarding the input authentication information by using the second authentication unit 103. Thereafter, the vehicle control apparatus 100 outputs control information to start the engine on the basis of at least one of the result of authentication performed by the first authentication unit 102 and the result of authentication performed by the second authentication unit 103. Thus, even when one of authentication performed by the first authentication unit 102 and authentication performed by the second authentication unit 103 fails, the vehicle control apparatus 100 can output the control information by using the result of the other authentication. In this manner, the vehicle control apparatus 100 can increase the security of the vehicle 1 and reduce unavailability of the vehicle 1. In particular, authentication regarding the sensing information about the user may fail depending on the state of the user, such as a physical condition, even for a user who is registered in advance. However, according to the above-described configuration, since authentication using the input authentication information can be performed, the risk of false authentication of the preregistered user can be reduced.

In addition, according to the first embodiment, the vehicle control apparatus 100 includes the first authentication information storage unit 104 that stores user information that is registered in advance and that corresponds to sensing information and a second authentication information storage unit 105 that stores authentication information that is registered in advance and that corresponds to the authentication information. The first authentication unit 102 acquires the preregistered user information from the first authentication information storage unit 104, and the second authentication unit 103 acquires the preregistered authentication information from the second authentication information storage unit 105. According to the above-described configuration, since the vehicle control apparatus 100 includes the first authentication information storage unit 104 and the second authentication information storage unit 105, the vehicle control apparatus 100 can protect the information stored in the first authentication information storage unit 104 and the second authentication information storage unit 105 from being tampered with from the outside.

Furthermore, in the vehicle control apparatus 100 according to the first embodiment, if at least one of authentication performed by the first authentication unit 102 and authentication performed by the second authentication unit 103 is successful, the control information output unit 106 outputs control information to start an engine. According to the above-described configuration, the user who uses the vehicle 1 can start the engine by using any one of authentication performed by the first authentication unit 102 and authentication performed by the second authentication unit 103.

In addition, in the vehicle control apparatus 100 according to the first embodiment, if authentication performed by the first authentication unit 102 fails, authentication is performed by the second authentication unit 103. According to the above-described configuration, authentication based on the sensing information about the user performed by the first authentication unit 102 is more simplified than authentication based on the input authentication information performed by the second authentication unit 103. However, the authentication accuracy is lower. By performing simplified authentication by the first authentication unit 102 first, the required operation performed by the user for authentication is reduced. Furthermore, by increasing the accuracy of authentication to be subsequently performed, the security level is increased.

In addition, in the vehicle control apparatus 100 according to the first embodiment, the start instruction indicates that the accessory power supply of the vehicle 1 is in an ON mode. According to the above-described configuration, authentication performed by the vehicle control apparatus 100 is incorporated into a series of operations performed by the user to start the engine. Therefore, smooth authentication process can be provided.

Modification of First Embodiment

Figure 7:
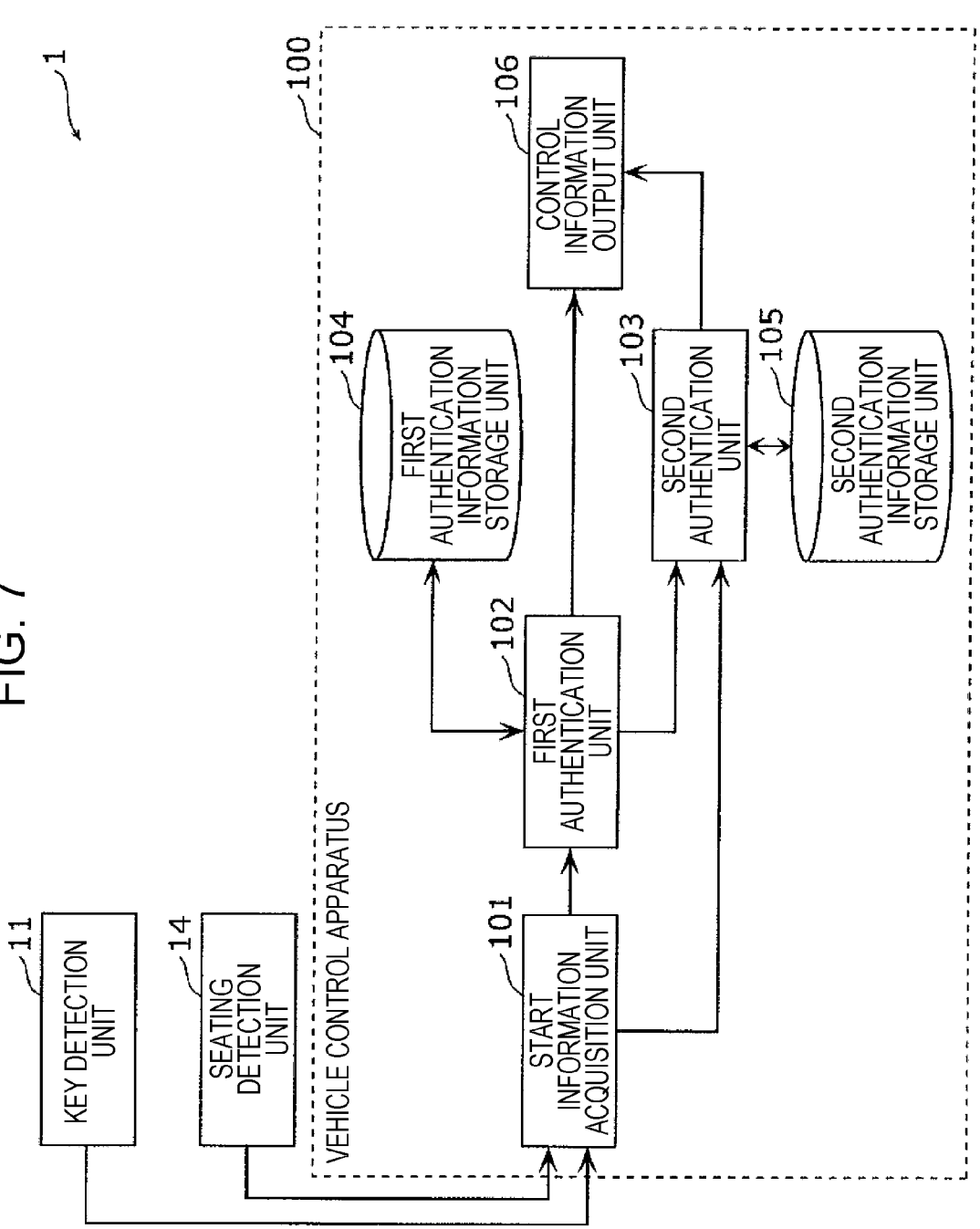
FIG. 7 is a block diagram of an example of the functional configuration of a vehicle control apparatus according to a modification of the first embodiment.

An example of a vehicle control apparatus 100 according to a modification of the first embodiment is described below. Hereinafter, differences between the modification and the first embodiment are mainly described. As illustrated in FIG. 7, according to the present modification, the start information acquisition unit 101 acquires, from the key detection unit 11 and the seating detection unit 14 of the vehicle 1, start information including detection information of the remote control key 2 of the vehicle 1 and a start instruction to start the engine of the vehicle 1 without using the accessory power supply activation unit 13. FIG. 7 is a block diagram of an example of the functional configuration of the vehicle control apparatus 100 according to the modification of the first embodiment.

The seating detection unit 14 acquires the load detected by the seat sensor 5 illustrated in FIG. 1 and detects the presence or absence of a person sitting on the driver's seat on the basis of the load. The start information acquisition unit 101 acquires the detection information about the remote control key 2 from the key detection unit 11. If, after acquiring the detection information of the remote control key 2, the start information acquisition unit 101 acquires, from the seating detection unit 14, the detection result indicating the presence of a person sitting on the seat of the driver's seat, the start information acquisition unit 101 considers the detection result as the start instruction to start the engine of the vehicle 1. The start information acquisition unit 101 outputs the start information including the detection information about the remote control key 2 and the start instruction to start the engine to the first authentication unit 102 and the second authentication unit 103.

As described above, according to the present modification, the trigger for the vehicle control apparatus 100 to start operating differs from that in the first embodiment. Since the other configurations and operations are the same as those in the first embodiment, descriptions thereof are not repeated. Even the present modification can provide the same effect as in the first embodiment. In the present modification, the start instruction indicates that the user has seated on the driver's seat of the vehicle 1. According to the above-described configuration, the user can start the engine without depressing the start button 3. Thus, the operation performed by the user to start the engine can be simplified.

Second Embodiment

A vehicle control apparatus 200 according to the second embodiment is described below. Unlike the first embodiment, the vehicle control apparatus 200 according to the second embodiment presents a user the performance of the first authentication and the second authentication before actually performing the first authentication and the second authentication. Differences between the second embodiment and the first embodiment are mainly described below.

Figure 8:
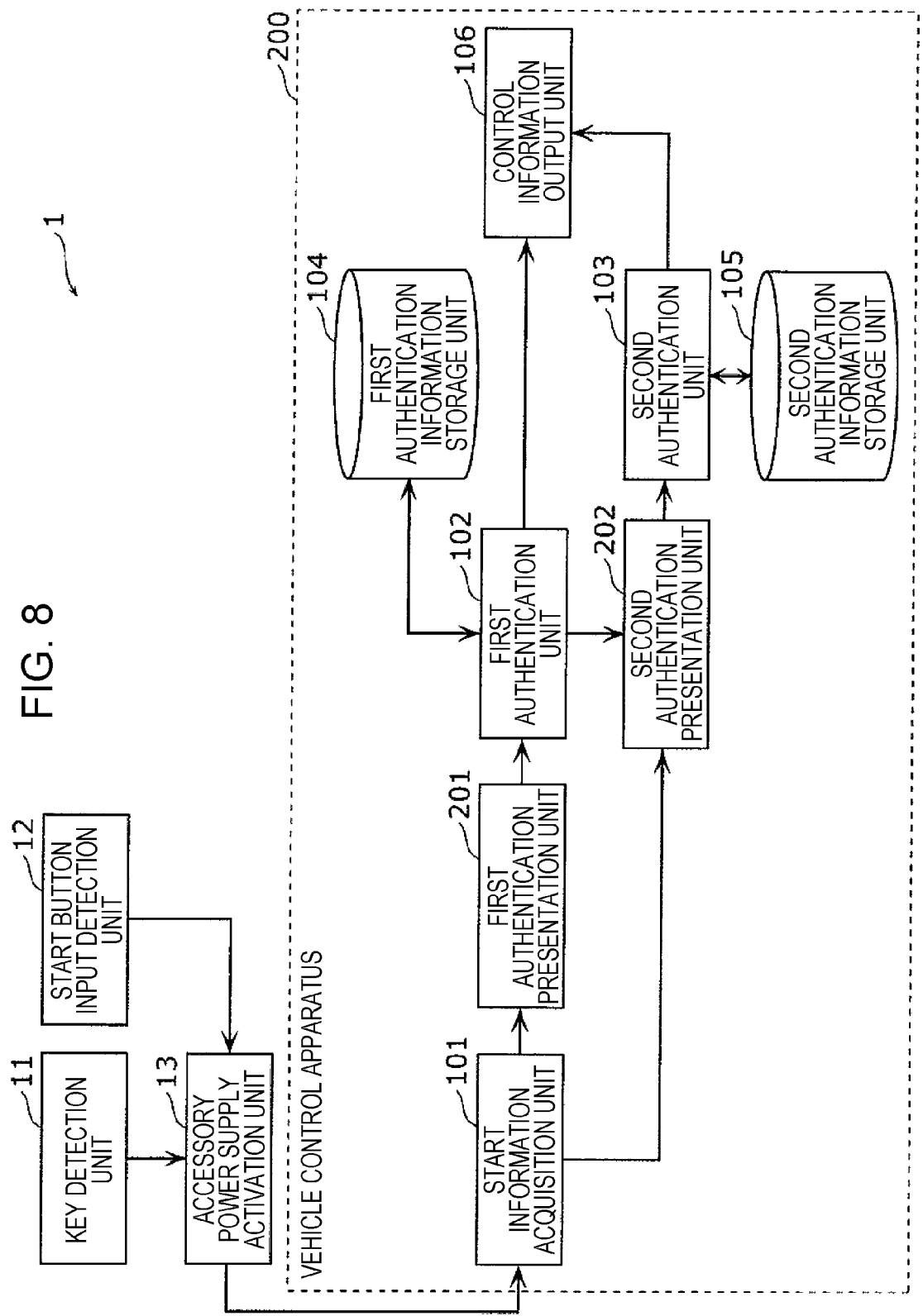
FIG. 8 is a block diagram of an example of the functional configuration of a vehicle control apparatus according to a second embodiment.

FIG. 8 is a block diagram of an example of the functional configuration of the vehicle control apparatus 200 according to the second embodiment. Like the vehicle control apparatus 100 according to the first embodiment, as illustrated in FIG. 8, the vehicle control apparatus 200 includes a start information acquisition unit 101, a first authentication unit 102, a second authentication unit 103, a first authentication information storage unit 104, a second authentication information storage unit 105, and a control information output unit 106. Furthermore, the vehicle control apparatus 200 includes a first authentication presentation unit 201 and a second authentication presentation unit 202. The configuration of each of the first authentication presentation unit 201 and the second authentication presentation unit 202 is the same as the configuration of any one of the constituent elements of the vehicle control apparatus 100, such as the start information acquisition unit 101, according to the first embodiment described above.

Upon acquiring the start information from the start information acquisition unit 101, the first authentication presentation unit 201 presents to the user that the first authentication is ready to be performed. In other words, the first authentication presentation unit 201 presents that the first authentication is currently available. For example, the first authentication presentation unit 201 may make an auditory presentation by voice via the loudspeaker of the display device 7, make a visual presentation by a text or the like in an image using the display of the display device 7, or make an auditory presentation and a visual presentation at the same time. For example, when the sensor of the vehicle 1 is the microphone 6, the first authentication presentation unit 201 makes a presentation to prompt the user to speak into the microphone 6. When the sensor of the vehicle 1 is the camera 8, the first authentication presentation unit 201 makes a presentation to prompt the user to turn the face to the camera 8. When the sensor of the vehicle 1 is the fingerprint authentication sensor 9, the first authentication presentation unit 201 makes a presentation to prompt the user to touch the fingerprint authentication sensor 9 with their finger. After the first authentication presentation unit 201 starts a presentation, the first authentication unit 102 activates the sensor of the vehicle 1. As a result, the sensor of the vehicle 1 can acquire sensing physical information at an intended point in time. That is, the sensor of the vehicle 1 can prevent unnecessary noise from entering the voice of the user, prevent an unwanted image without the face of the user from being captured, or prevent a fingerprint image other than user's fingerprint image from being acquired.

The second authentication presentation unit 202 presents to the user that the second authentication is ready to be performed. In other words, the second authentication presentation unit 202 presents that the second authentication is available. Upon receiving the start information from the start information acquisition unit 101, the second authentication presentation unit 202 may make the presentation. Alternatively, instead of making the presentation immediately after acquiring the start information, the second authentication presentation unit 202 may make the presentation when the first authentication is unavailable or when the first authentication fails a number of times greater than the first threshold value. For example, the second authentication presentation unit 202 may make an auditory presentation by voice via the loudspeaker of the display device 7, make a visual presentation by a text or the like in an image using the display of the display device 7, or make an auditory presentation and a visual presentation at the same time. When making a presentation simultaneously with the first authentication presentation unit 201, the second authentication presentation unit 202 may make the presentation in a different way from the first authentication presentation unit 201. After the second authentication presentation unit 202 starts a presentation, the second authentication unit 103 starts receiving an input of authentication information via the input interface 7a.

The other configurations and operations of the vehicle control apparatus 200 according to the second embodiment are the same as those of the first embodiment and, thus, descriptions of the configurations and operations are not repeated. Even the vehicle control apparatus 200 according to the second embodiment can provide the same effect as in the first embodiment. In addition, the vehicle control apparatus 200 according to the second embodiment includes the first authentication presentation unit 201 that makes a presentation indicating that authentication is ready to be performed by the first authentication unit 102 and the second authentication presentation unit 202 that makes a presentation indicating that authentication is ready to be performed by the second authentication unit 103. According to the above-described configuration, activation of the apparatus for authentication by the first authentication unit 102 and activation of the apparatus for authentication by the second authentication unit 103 are performed after the presentation given by the first authentication presentation unit 201 and the presentation given by the second authentication presentation unit 202, respectively. In this manner, information unnecessary for authentication is not acquired by the apparatuses for authentication. As a result, the authentication accuracy is increased. In addition, since unnecessary operation of the apparatus for authentication is reduced, power saving can be achieved.

Third Embodiment

A vehicle control apparatus 300 according to the third embodiment is described below. The vehicle control apparatus 300 according to the third embodiment performs the first authentication using the voice of a user input to the microphone 6 of the vehicle 1 and performs the second authentication using a cryptography key input via the input interface 7a. Differences between the third embodiment and each of the first and second embodiments are mainly described below.

Figure 9:
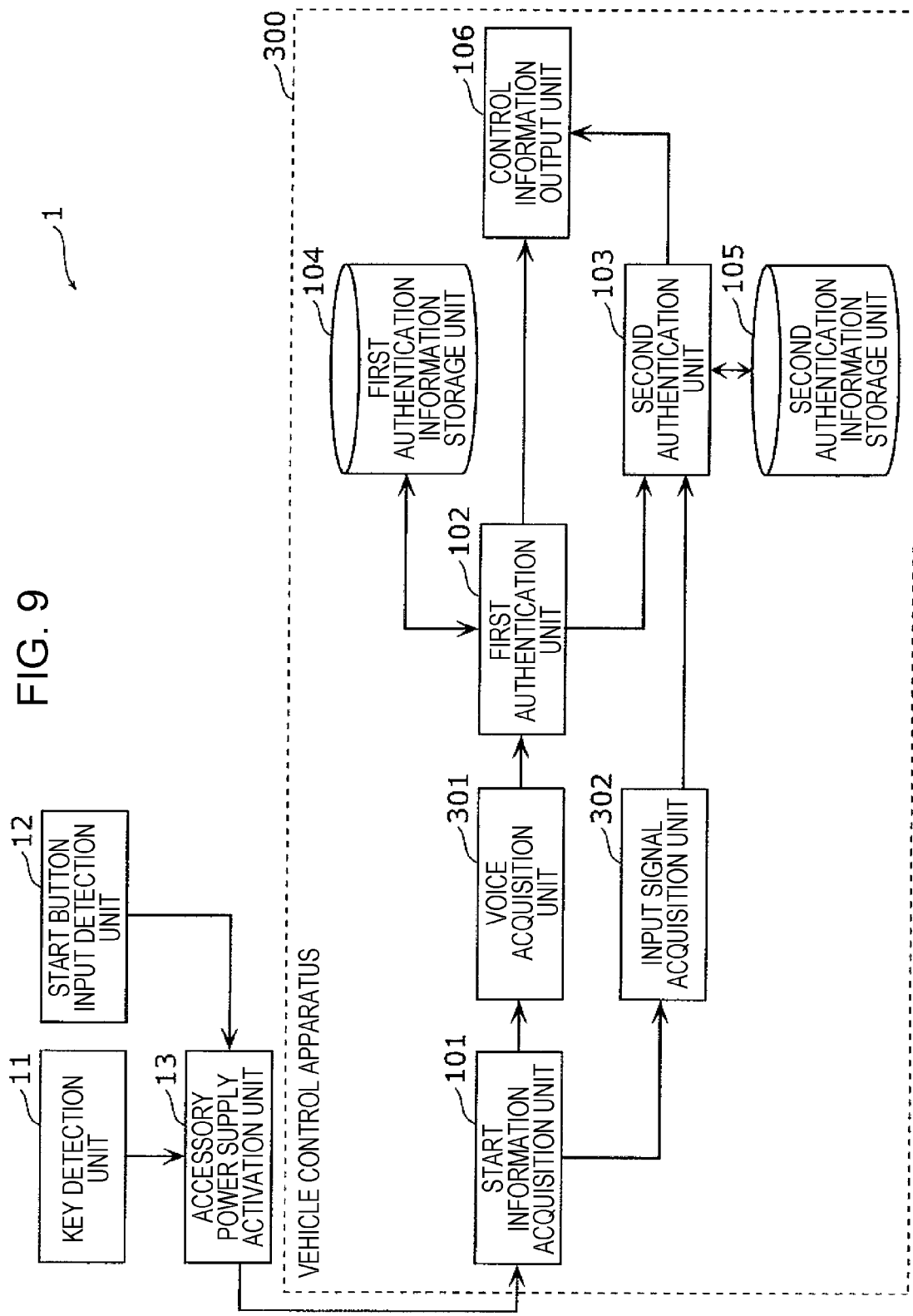
FIG. 9 is a block diagram of an example of the functional configuration of a vehicle control apparatus according to a third embodiment.

FIG. 9 is a block diagram of an example of the functional configuration of the vehicle control apparatus 300 according to the third embodiment. Like the vehicle control apparatus 100 according to the first embodiment, as illustrated in FIG. 9, the vehicle control apparatus 300 includes a start information acquisition unit 101, a first authentication unit 102, a second authentication unit 103, a first authentication information storage unit 104, a second authentication information storage unit 105, and a control information output unit 106. Furthermore, the vehicle control apparatus 300 includes a voice acquisition unit 301 and an input signal acquisition unit 302. Each of the configurations of the voice acquisition unit 301 and the input signal acquisition unit 302 is the same as the configuration of any one of the above-described constituent elements of the vehicle control apparatus 100, such as the start information acquisition unit 101, according to the first embodiment.

Upon acquiring the start information from the start information acquisition unit 101, the voice acquisition unit 301 activates the microphone 6 of the vehicle 1. Thereafter, the voice acquisition unit 301 acquires the user's voice signal input via the microphone 6. The voice acquisition unit 301 may extract a text from the acquired voice signal through speech recognition and output the text to the first authentication unit 102 as sensing physical information or may extract the feature from the acquired voice signal and output the feature to the first authentication unit 102 as sensing physical information. Alternatively, the voice acquisition unit 301 may extract both text and feature and output them to the first authentication unit 102.

The first authentication unit 102 matches the text and/or the feature of the acquired voice signal with the text and/or the feature of the voice of the user (the voice information of a preregistered user and stored in the first authentication information storage unit 104). Thus, the first authentication unit 102 authenticates whether the user of the sensing physical information is a preregistered user on the basis of the degree of coincidence or the similarity between the two.

Upon acquiring the start information from the start information acquisition unit 101, the input signal acquisition unit 302 starts receiving an input of the cryptography key via the input interface 7a. Thereafter, the input signal acquisition unit 302 acquires an input signal of the cryptographic key input via the input interface 7a and outputs the cryptography key to the second authentication unit 103.

The second authentication unit 103 matches the acquired cryptography key with the cryptography key registered and stored in the second authentication information storage unit 105 in advance. If the two cryptography keys match, the second authentication unit 103 determines that the authentication is successful. That is, the second authentication unit 103 authenticates that the user who input the cryptography key is a preregistered user. However, if the two cryptography keys do not match, the second authentication unit 103 determines that the authentication has failed.

The other configurations and operations of the vehicle control apparatus 300 according to the third embodiment are the same as those of the first embodiment and, thus, descriptions of the configurations and operations are not repeated. Even the vehicle control apparatus 300 according to the third embodiment can provide the same effect as in the first embodiment. In addition, in the vehicle control apparatus 300 according to the third embodiment, the first authentication unit 102 acquires the voice of the user input via the microphone 6 of the vehicle 1 as sensing information, acquires the voice information of the preregistered user as information about the preregistered user, and authenticates whether the user uttered the voice is the preregistered user. According to the above-described configuration, the authentication by the first authentication unit 102 is performed by using the voice uttered by the user who uses the vehicle 1. Thus, the operation performed by the user for authentication is simplified.

Fourth Embodiment

A vehicle control apparatus 400 according to the fourth embodiment is described below. Unlike the third embodiment, the vehicle control apparatus 400 according to the fourth embodiment presents to the user that the first authentication and the second authentication are ready to be performed before performing the first authentication and the second authentication. Differences between the fourth embodiment and each of the first to third embodiments are mainly described below.

Figure 10:
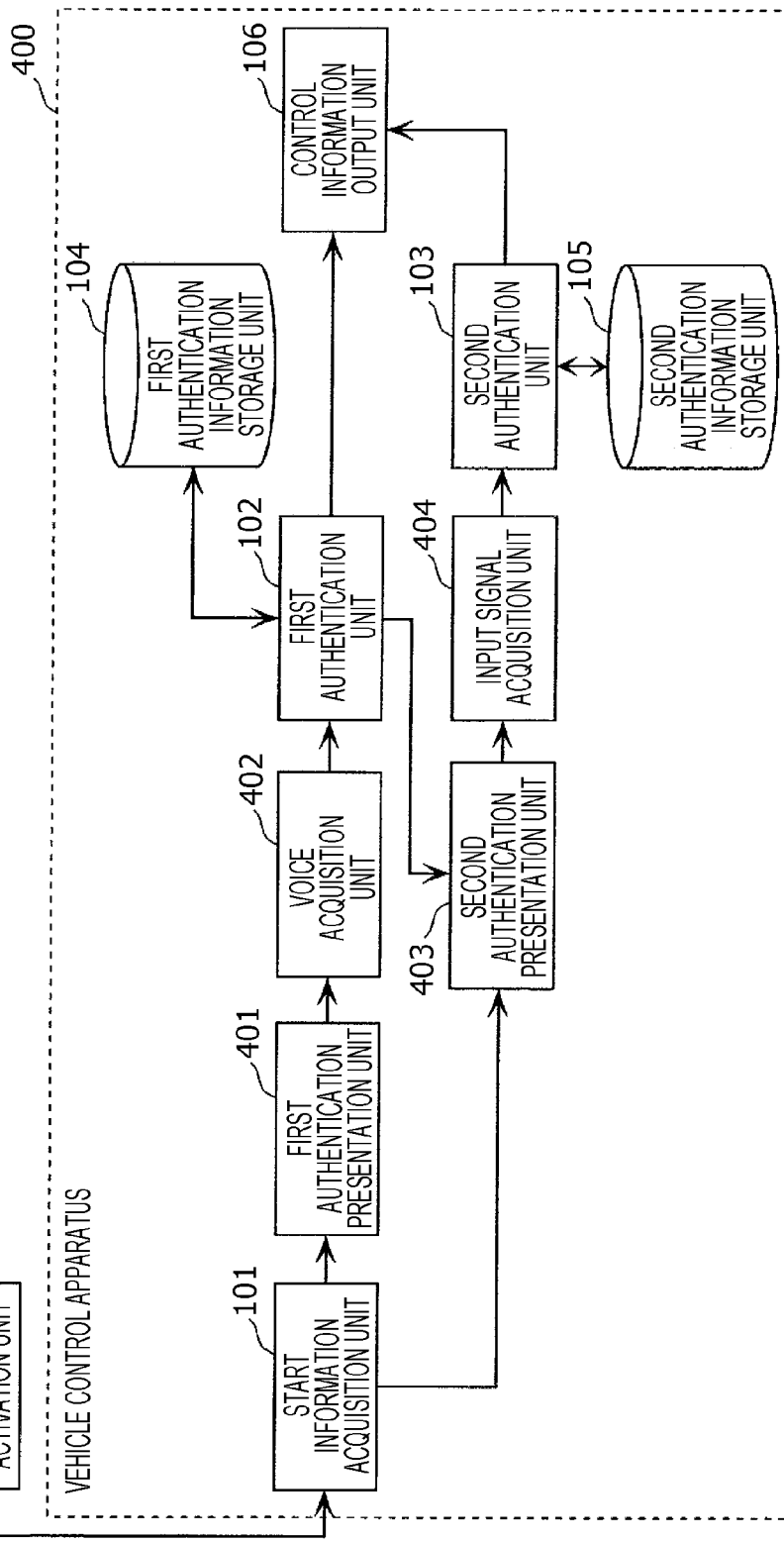
FIG. 10 is a block diagram of an example of the functional configuration of a vehicle control apparatus according to a fourth embodiment.

FIG. 10 is a block diagram of an example of the functional configuration of the vehicle control apparatus 400 according to the fourth embodiment. Like the vehicle control apparatus 300 according to the third embodiment, as illustrated in FIG. 10, the vehicle control apparatus 400 includes a start information acquisition unit 101, a first authentication unit 102, a second authentication unit 103, a first authentication information storage unit 104, a second authentication information storage unit 105, a control information output unit 106, a voice acquisition unit 402, and an input signal acquisition unit 404. Furthermore, like the vehicle control apparatus 200 according to the second embodiment, the vehicle control apparatus 400 includes a first authentication presentation unit 401 and a second authentication presentation unit 403. The configurations of the voice acquisition unit 402 and the input signal acquisition unit 404 are the same as those of the voice acquisition unit 301 and the input signal acquisition unit 302 according to the third embodiment, respectively. The configurations of the first authentication presentation unit 401 and the second authentication presentation unit 403 are the same as those of the first authentication presentation unit 201 and the second authentication presentation unit 202 according to the second embodiment.

Upon acquiring the start information from the start information acquisition unit 101, the first authentication presentation unit 401 presents to the user that the first authentication is ready to be performed. After starting the presentation, the first authentication presentation unit 401 activates the voice acquisition unit 301.

The second authentication presentation unit 403 presents to the user that the second authentication is ready to be performed. Upon acquiring the start information from the start information acquisition unit 101, the second authentication presentation unit 403 may make the presentation. Alternatively, instead of making a presentation immediately after acquiring the start information, the second authentication presentation unit 202 may make the presentation if the first authentication is unavailable or if the first authentication fails a number of times greater than the first threshold value. After starting the presentation, the second authentication presentation unit 403 activates the input signal acquisition unit 404.

The other configurations and operations of the vehicle control apparatus 400 according to the fourth embodiment are the same as those of the third embodiment and, thus, descriptions of the configurations and operations are not repeated. Even the vehicle control apparatus 400 according to the fourth embodiment can provide the same effects as those in the second and third embodiments.

Fifth Embodiment

A vehicle control apparatus 500 according to the fifth embodiment is described below. The vehicle control apparatus 500 according to the fifth embodiment performs the first authentication by using a text included in the voice of the user input to the microphone 6 of the vehicle 1. Differences between the fifth embodiment and each of the first to fourth embodiments are mainly described below.

Figure 11:
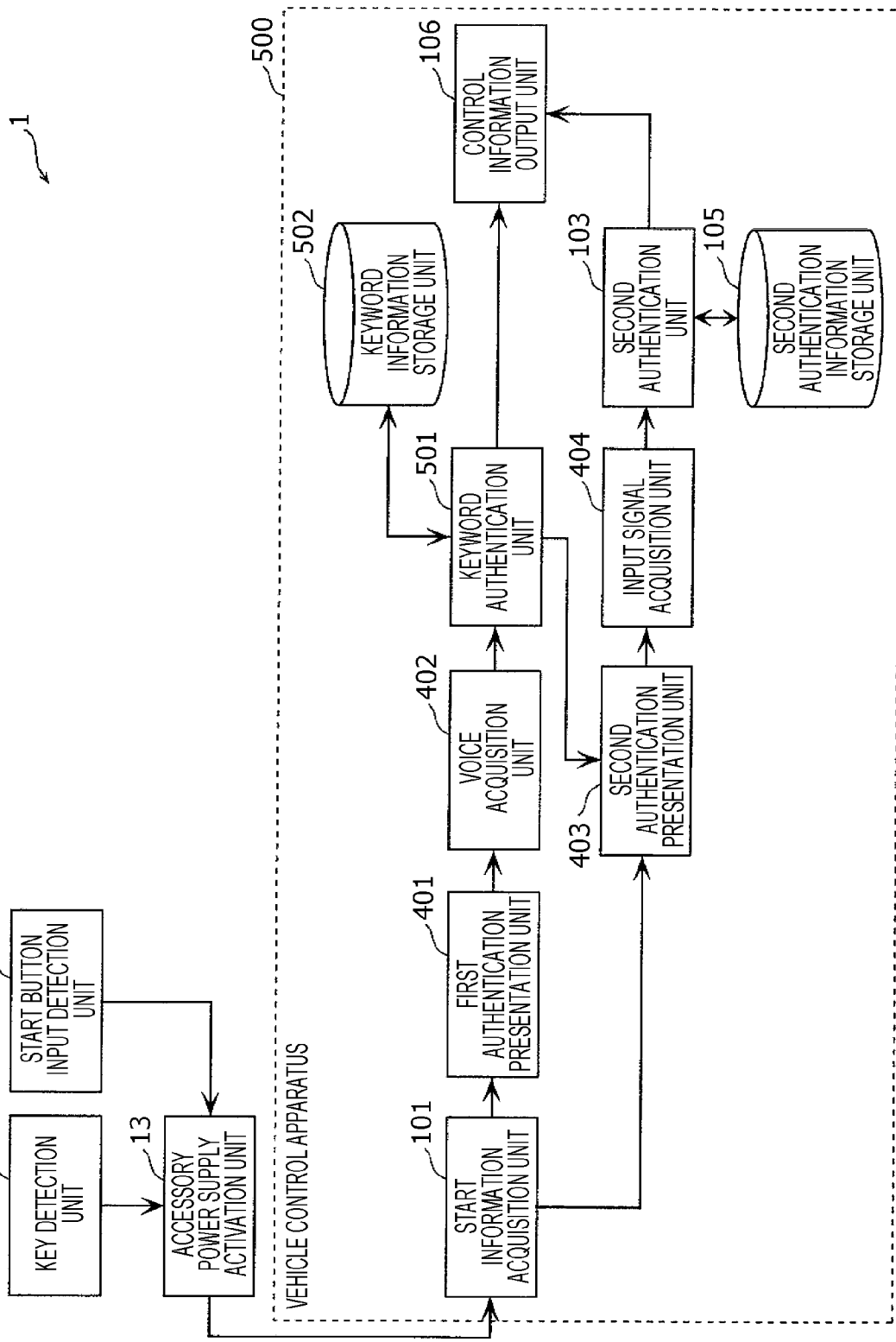
FIG. 11 is a block diagram illustrating an example of the functional configuration of a vehicle control apparatus according to a fifth embodiment.

FIG. 11 is a block diagram of an example of the functional configuration of the vehicle control apparatus 500 according to the fifth embodiment. Like the vehicle control apparatus 400 according to the fourth embodiment, as illustrated in FIG. 11, the vehicle control apparatus 500 includes a start information acquisition unit 101, a second authentication unit 103, a second authentication information storage unit 105, a control information output unit 106, a first authentication presentation unit 401, a voice acquisition unit 402, a second authentication presentation unit 403, and an input signal acquisition unit 404. Furthermore, the vehicle control apparatus 500 includes a keyword authentication unit 501 and a keyword information storage unit 502 instead of the first authentication unit 102 and the first authentication information storage unit 104. The configurations of the keyword authentication unit 501 and the keyword information storage unit 502 may be the same as those of the first authentication unit 102 and the first authentication information storage unit 104, respectively. The keyword authentication unit 501 is an example of the first authentication unit, and the keyword information storage unit 502 is an example of the first storage unit.

The keyword information storage unit 502 stores information about texts of keywords registered in advance. A keyword may be input as a speech signal via the microphone 6 and be converted into a text from the speech signal by speech recognition. Alternatively, a keyword may be a text input via the input interface 7a.

The voice acquisition unit 402 speech-recognizes the speech signal of the user input via the microphone 6, extracts text included in the speech signal, and outputs the text to the keyword authentication unit 501. Extraction of text from a speech signal can be accomplished by using a variety of well-known speech recognition techniques.

The keyword authentication unit 501 matches the text of the acquired speech signal with the text of a keyword registered in advance and stored in the keyword information storage unit 502. When the text of the speech signal matches the text of the keyword, the keyword authentication unit 501 determines that the authentication is successful. That is, the keyword authentication unit 501 authenticates that the user who input the speech signal is a preregistered user. When the two texts do not match, the keyword authentication unit 501 determines that authentication has failed.

The other configurations and operations of the vehicle control apparatus 500 according to the fifth embodiment are the same as those of the fourth embodiment and, thus, descriptions of the configurations and operations are not repeated. In addition, even the vehicle control apparatus 500 according to the fifth embodiment can provide the same effects as those of the fourth embodiment. In the vehicle control apparatus 500 according to the fifth embodiment, the first authentication unit 102 performs authentication on the basis of the degree of coincidence between the text acquired through speech recognition performed on the speech signal and the text included in the speech information of the preregistered user. According to the above-described configuration, authentication by the first authentication unit 102 is performed by using the text included in speech uttered by a user using the vehicle 1. The text is extracted by performing a speech recognition process on the speech signal. This process can be performed with relatively low processing load. As a result, the processing speed of the vehicle control apparatus 100 can be increased.

Sixth Embodiment

A vehicle control apparatus 600 according to the sixth embodiment is described below. The vehicle control apparatus 600 according to the sixth embodiment performs the first authentication by using the feature of the voice of the user input to the microphone 6 of the vehicle 1. Differences between the sixth embodiment and each of the first to fifth embodiments are mainly described below.

Figure 12:
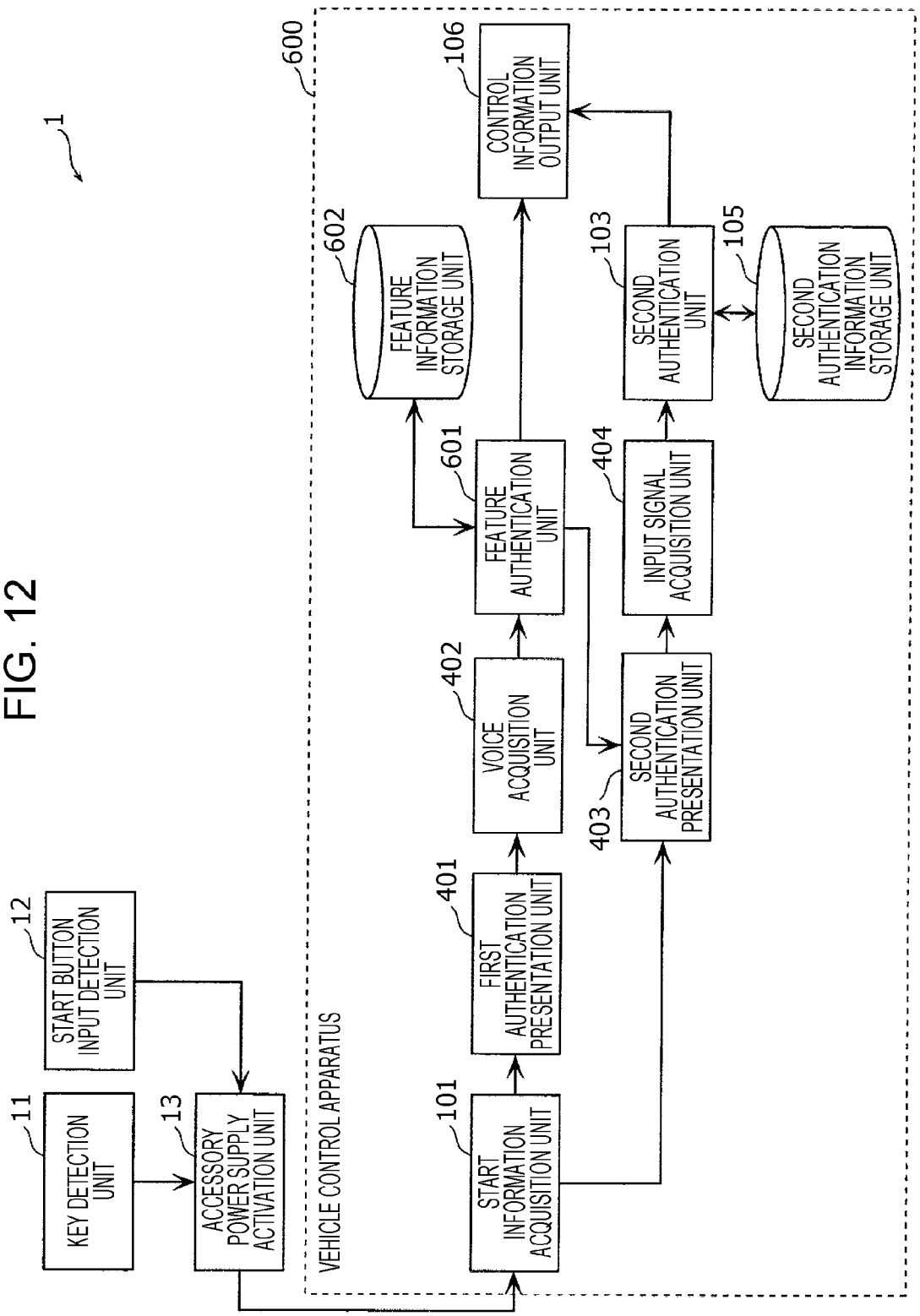
FIG. 12 is a block diagram illustrating an example of the functional configuration of a vehicle control apparatus according to a sixth embodiment.

FIG. 12 is a block diagram of an example of the functional configuration of the vehicle control apparatus 600 according to the sixth embodiment. Like the vehicle control apparatus 400 according to the fourth embodiment, as illustrated in FIG. 12, the vehicle control apparatus 600 includes a start information acquisition unit 101, a second authentication unit 103, a second authentication information storage unit 105, a second authentication information storage unit 105, a control information output unit 106, a first authentication presentation unit 401, a voice acquisition unit 402, a second authentication presentation unit 403, and an input signal acquisition unit 404. Furthermore, the vehicle control apparatus 600 includes a feature authentication unit 601 and a feature information storage unit 602 instead of the first authentication unit 102 and the first authentication information storage unit 104. The configurations of the feature authentication unit 601 and the feature information storage unit 602 may be the same as those of the first authentication unit 102 and the first authentication information storage unit 104, respectively. The feature authentication unit 601 is an example of the first authentication unit, and the feature information storage unit 602 is an example of the first storage unit.

The feature information storage unit 602 stores information about the feature of the voice of a preregistered user. The feature may be extracted from the voice signal of the user acquired via the microphone 6 by the vehicle control apparatus 600. Alternatively, the feature may be extracted from the voice signal of the user by using a device located outside the vehicle 1. The feature information storage unit 602 may store the information about the feature of the voice of one user or the information about the features of the voices of a plurality of users.

An example of the information about the feature of the voice of a user is a personal voice dictionary used to identify a user. A personal voice dictionary is formed by a voice model generated on the basis of the feature of user's voice and the feature of voice data of many and unspecified speakers, noise data, or the both.

The voice acquisition unit 402 extracts the feature from the user's voice signal input via the microphone 6 and outputs the feature to the feature authentication unit 601. Extraction of feature from a voice signal can be accomplished by using a variety of well-known feature extraction techniques.

The feature authentication unit 601 generates a voice model of the voice signal on the basis of the acquired feature of the voice signal and matches the voice model of the voice signal with the personal voice dictionary, which is the information about the feature of the voice of the preregistered user and stored in the feature information storage unit 602. If the similarity between the voice model of the voice signal and the voice model of the personal voice dictionary is higher than or equal to predefined similarity, the feature authentication unit 601 determines that the authentication is successful and, thus, authenticates that the user that emits the voice signal is a preregistered user. However, if the similarity is lower than the predefined similarity, the feature authentication unit 601 determines that the authentication has failed.

Note that the feature of voice represents the characteristics of the speaker's voice, and the speaker can be identified by using the feature of the voice. One of methods for identifying a speaker by using the feature of voice is a speaker identification method called i-vector. In i-vector based speaker identification, factor analysis is used to extract unique features contained in speakers, and the speakers are identified by comparing the extracted features with one another. Since i-vector uses factor analysis for feature extraction, the feature can be expressed with fewer dimensions and, thus, the speaker individuality can be efficiently expressed even from a small amount of utterance data. The feature authentication unit 601 calculates the similarity between the voice model of the voice signal and the voice model of the personal voice dictionary by using a speaker identification method, such as i-vector. In this manner, the feature authentication unit 601 performs authentication by identifying the speaker. A speaker identification method using i-vector or the like is well known (refer to, for example, Japanese Unexamined Patent Application Publication No. 2017-161825). Accordingly, detailed description of the speaker identification method is not provided here.

The other configurations and operations of the vehicle control apparatus 600 according to the sixth embodiment are the same as those of the fourth embodiment and, thus, descriptions of the configurations and operations are not repeated. In addition, even the vehicle control apparatus 600 according to the sixth embodiment can provide the same effects as those in the fourth embodiment. Furthermore, in the vehicle control apparatus 600 according to the sixth embodiment, the feature authentication unit 601 performs authentication on the basis of the similarity between the feature acquired from the voice and the feature of the voice included in the voice information about the preregistered user. According to the above-described configuration, authentication by the feature authentication unit 601 is performed by using the feature included in the voice uttered by the user who uses the vehicle 1. That is, in the authentication by the feature authentication unit 601, the speaker who uttered the voice is identified, and authentication is performed to verify whether the speaker corresponds to a preregistered user. As a result, the authentication accuracy of the user is increased. That is, the security is improved.

Seventh Embodiment

A vehicle control apparatus 700 according to the seventh embodiment is described below. The vehicle control apparatus 700 according to the seventh embodiment performs the first authentication by using text and the feature included in the speech of the user input to the microphone 6 of the vehicle 1. Differences between the seventh embodiment and each of the first to sixth embodiments are mainly described below.

Figure 13:
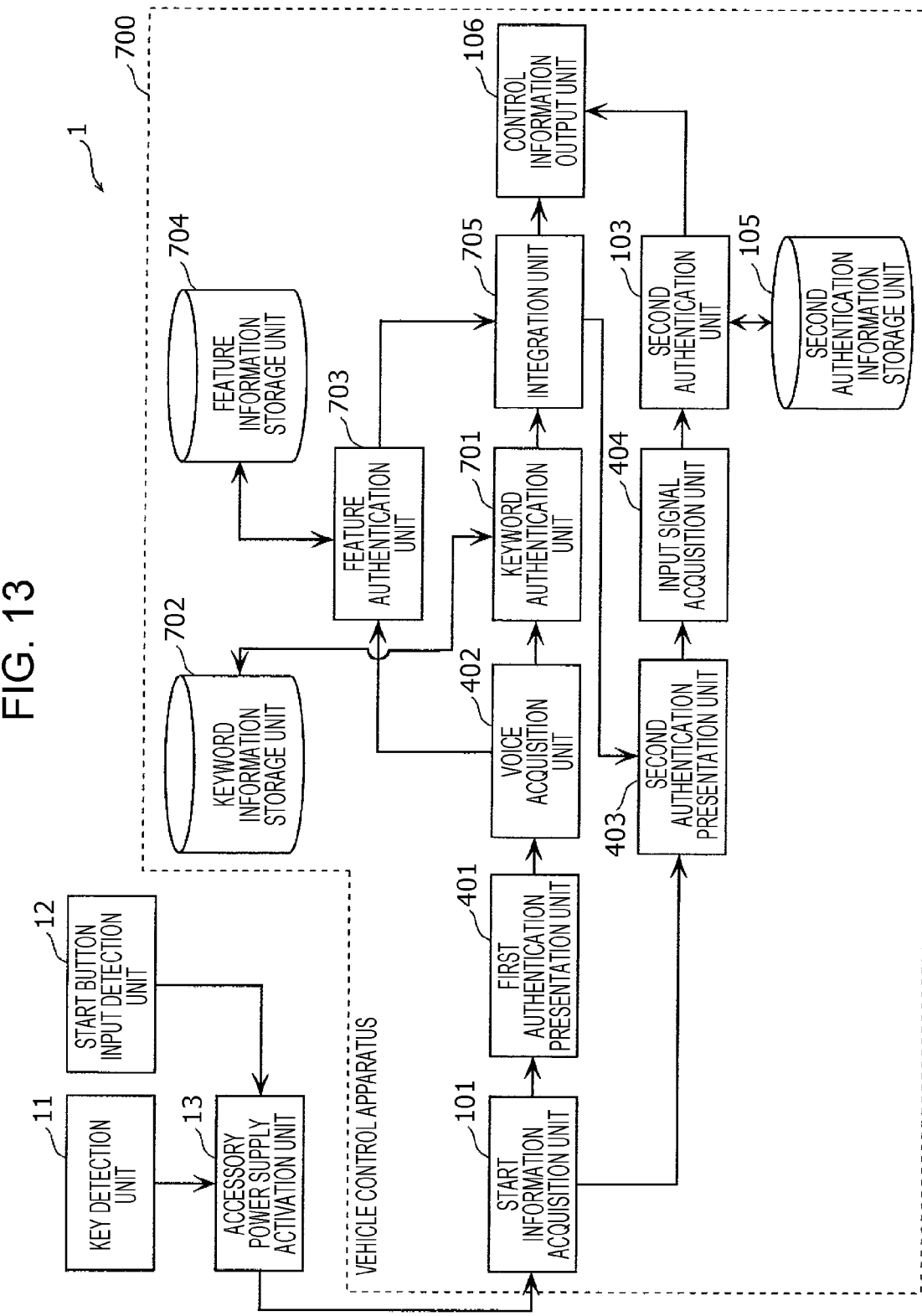
FIG. 13 is a block diagram illustrating an example of the functional configuration of a vehicle control apparatus according to a seventh embodiment.

FIG. 13 is a block diagram of an example of the functional configuration of the vehicle control apparatus 700 according to the seventh embodiment. Like the vehicle control apparatus 400 according to the fourth embodiment, as illustrated in FIG. 13, the vehicle control apparatus 700 includes a start information acquisition unit 101, a second authentication unit 103, a second authentication information storage unit 105, a control information output unit 106, a first authentication presentation unit 401, a voice acquisition unit 402, a second authentication presentation unit 403, and an input signal acquisition unit 404. Furthermore, like the vehicle control apparatus 500 according to the fifth embodiment, the vehicle control apparatus 700 includes a keyword authentication unit 701 and a keyword information storage unit 702. Still furthermore, like the vehicle control apparatus 600 according to the sixth embodiment, the vehicle control apparatus 700 includes a feature authentication unit 703 and a feature information storage unit 704. Yet still furthermore, the vehicle control apparatus 700 includes an integration unit 705.

The keyword authentication unit 701 and the keyword information storage unit 702 are the same as the keyword authentication unit 501 and the keyword information storage unit 502 according to the fifth embodiment, respectively. The keyword authentication unit 701 outputs the authentication result to the integration unit 705.

The feature authentication unit 703 and the feature information storage unit 704 are the same as the feature authentication unit 601 and the feature information storage unit 602 according to the sixth embodiment, respectively. The feature authentication unit 703 outputs the authentication result to the integration unit 705.

In addition, the voice acquisition unit 402 extracts text and the feature from the user's speech signal input via the microphone 6, outputs the text to the keyword authentication unit 701, and outputs the feature to the feature authentication unit 601.

The integration unit 705 integrates the authentication result acquired from the keyword authentication unit 701 and the authentication result acquired from the feature authentication unit 703 and determines whether the user who input the voice signal is a preregistered user. More specifically, if the integration unit 705 acquires the authentication result indicating successful authentication from the keyword authentication unit 701 and acquires the authentication result indicating successful authentication from the feature authentication unit 703, the integration unit 705 determines that the user who input the speech signal is a preregistered user. However, if at least one of the authentication result acquired from the keyword authentication unit 701 and the authentication result acquired from the feature authentication unit 703 indicates authentication failure, the integration unit 705 determines that the user who input the voice signal is not a preregistered user. The integration unit 705 outputs the determination result to the control information output unit 106 or the second authentication presentation unit 403 as the integrated authentication result of the first authentication.

The other configurations and operations of the vehicle control apparatus 700 according to the seventh embodiment are the same as those of the fourth to sixth embodiments and, thus, descriptions of the configurations and operations are not repeated. In addition, even the vehicle control apparatus 700 according to the seventh embodiment can provide the same effects as those in the fourth to sixth embodiments. In the vehicle control apparatus 700 according to the seventh embodiment, the keyword authentication unit 701 performs authentication on the basis of the degree of coincidence between the text acquired by speech-recognizing the speech and the text included in the speech information about the preregistered user. The feature authentication unit 703 performs authentication on the basis of the similarity between the feature acquired from the voice and the feature of the voice included in the speech information of the preregistered user. If the two authentication attempts succeed, the integration unit 705 authenticates that the user who utters the speech is a preregistered user. According to the above-described configuration, the first authentication is performed by using text and the feature included in the speech uttered by a user who uses the vehicle 1. If the authentication using the text and the authentication using the feature succeed, the first authentication is successful. Thus, the security is increased.

Eighth Embodiment

A vehicle control apparatus 800 according to the eighth embodiment is described below. The vehicle control apparatus 800 according to the eighth embodiment identifies an age group of the user from the feature included in the voice of the user input to the microphone 6 of the vehicle 1 and outputs the driving support information corresponding to the age group. Differences between the eighth embodiment and each of the first to seventh embodiments are mainly described below.

Figure 14:
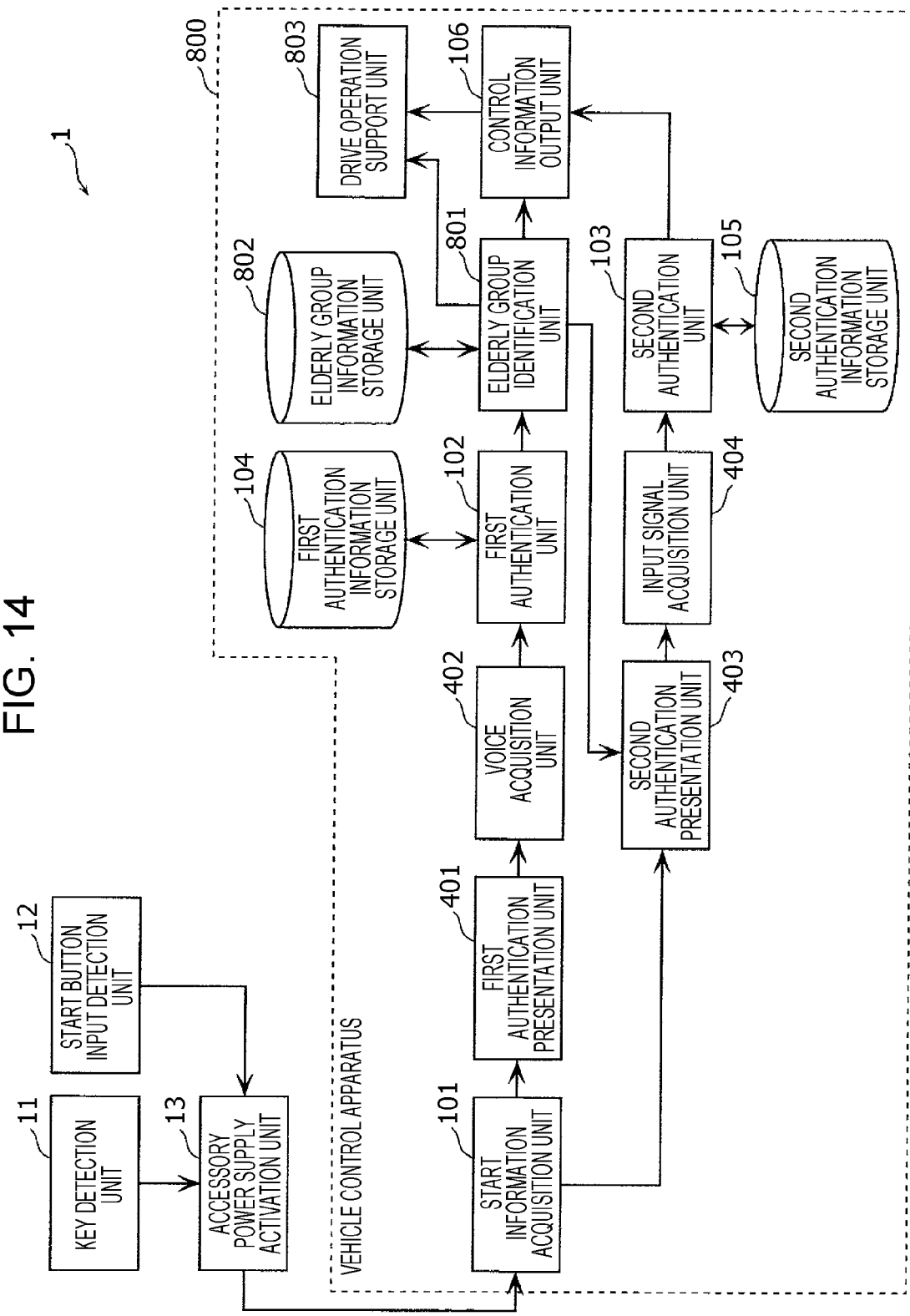
FIG. 14 is a block diagram illustrating an example of the functional configuration of a vehicle control apparatus according to an eighth embodiment.

FIG. 14 is a block diagram of an example of the functional configuration of the vehicle control apparatus 800 according to the eighth embodiment. Like the vehicle control apparatus 400 according to the fourth embodiment, as illustrated in FIG. 14, the vehicle control apparatus 800 includes a start information acquisition unit 101, a first authentication unit 102, a second authentication unit 103, a first authentication information storage unit 104, a second authentication information storage unit 105, a control information output unit 106, a first authentication presentation unit 401, a voice acquisition unit 402, a second authentication presentation unit 403, and an input signal acquisition unit 404. Furthermore, the vehicle control apparatus 800 includes an elderly group identification unit 801, an elderly group information storage unit 802, and a drive operation support unit 803.

The elderly group information storage unit 802 stores information about the feature of the voice of an elderly speaker. Such feature information is information about the features extracted from the voices of many and unspecified elderly speakers. An example of the feature information is an elderly speaker group voice dictionary for identifying an elderly person. The elderly speaker group voice dictionary is composed of a voice model generated on the basis of the features extracted by using voice data of many and unspecified elderly speakers, noise data, or the both. In general, the muscle strength of the articulatory organs reduces with aging and, thus, the vocal intensity in speech behavior decreases. Thus, the opening and closing of the lips and the movement of the tongue become slow. As a result, the voice of an elderly speaker has characteristics that differ from those of the voices of speakers other than the elderly persons. Information about the feature peculiar to elderly speakers is stored in the elderly group information storage unit 802. The information about the feature of the voices of elderly speakers can be stored in the elderly group information storage unit 802 in advance before the vehicle 1 is delivered to the user (e.g., during the manufacturing process of the vehicle 1).

Note that the elderly group may be set to any age group. For example, persons who are over the age of 70 (who are required to put the elderly driver sticker on a vehicle when driving the vehicle in Japan) may be classified into the elderly group. Alternatively, persons who are over the age of 75 (who are required to put the elderly driver sticker on a vehicle and, additionally, take a cognitive test and a seniors driver training course when renewing their licenses in Japan) may be classified into the elderly group.

The elderly group identification unit 801 acquires, from the first authentication unit 102, a result of first authentication and the voice signal or the feature of the voice signal used for the first authentication. The elderly group identification unit 801 extracts the feature from the acquired voice signal. In addition, the elderly group identification unit 801 generates a voice model of the user who has input the voice signal on the basis of the feature. The elderly group identification unit 801 matches the generated voice model with the elderly speaker group voice dictionary stored in the elderly group information storage unit 802. If the similarity between the voice model and the voice model of the elderly speaker group voice dictionary is higher than or equal to a predefined similarity, the elderly group identification unit 801 determines that the user of the voice model falls in the elderly group. However, if the similarity is lower than the predefined similarity, the elderly group identification unit 801 determines that the user does not fall in the elderly group. The elderly group identification unit 801 outputs the determination result, that is, the identification result to the drive operation support unit 803 and outputs an authentication result received from the first authentication unit 102 to the control information output unit 106 or the second authentication presentation unit 403. As described above, the elderly group identification unit 801 acquires the voice of the user input via the microphone 6 of the vehicle 1 and identifies whether the user who uttered the voice falls in the elderly group.

The drive operation support unit 803 outputs support information, which is information used to support the drive operation performed by the user in the elderly group, in accordance with the identification result of the elderly group identification unit 801. More specifically, upon acquiring, from the elderly group identification unit 801, the identification result indicating that the user of the voice model falls in the elderly group, the drive operation support unit 803 outputs the support information to the display device 7, which outputs the information. The display device 7 outputs the support information visually and/or auditorily via a display and/or a loudspeaker. To avoid a misoperation of the user, alert the user, and avoid careless driving, the drive operation support unit 803 may output appropriate support information when the user starts driving the vehicle 1 and while the user is driving the vehicle 1, for example, immediately after the user starts the engine of the vehicle 1 and when the user starts the vehicle 1 that is stopped or parked, stops the vehicle 1, reverses the vehicle 1, turns the vehicle 1 right or left or U-turns the vehicle 1, and drives the vehicle 1 straight at a constant speed for a long time. For example, when the user starts the vehicle 1 that is stopped or parked, the drive operation support unit 803 may output the support information that alerts a case of user error in which the user steps on the accelerator pedal instead of the brake.

The other configurations and operations of the vehicle control apparatus 800 according to the eighth embodiment are the same as those of the fourth embodiment and, thus, descriptions of the configurations and operations are not repeated. In addition, even the vehicle control apparatus 800 according to the eighth embodiment can provide the same effect as in the fourth embodiment. Furthermore, the vehicle control apparatus 800 according to the eighth embodiment includes the elderly group identification unit 801, which serves as an identification unit that acquires the voice of the user input via the microphone 6 of the vehicle 1 and identifies whether the user who uttered the voice falls in the elderly group, and the drive operation support unit 803, which serves as a support unit that outputs information used to support the drive operation of the user in the elderly group in accordance with the identification result of the elderly group identification unit 801. According to the above-described configuration, in addition to authenticating whether the user who uses the vehicle 1 is a preregistered user, the vehicle control apparatus 800 identifies the age group of the user who uses the vehicle 1. Thus, the vehicle control apparatus 800 can further provide assistance in driving a vehicle in accordance with the identified age group.

Furthermore, in the vehicle control apparatus 800 according to the eighth embodiment, the elderly group identification unit 801 identifies the age group of the user on the basis of the feature of the user's voice signal. However, the operation performed by the elderly group identification unit 801 is not limited thereto. For example, the first authentication information storage unit 104 may store the voice information in association with the information about the user who emitted the voice information. The user information may include the age of a corresponding user. In this case, the elderly group identification unit 801 may obtain, from the first authentication information storage unit 104, the user information corresponding to the voice information of the user already successfully authenticated by the first authentication unit 102 and identify the age group of the user who was successfully authenticated. Alternatively, the elderly group identification unit 801 may acquire the user information from the first authentication information storage unit 104 via the first authentication unit 102.

Others

While the vehicle control apparatuses and the like according to one or more aspects have been described with reference to the embodiments above, the present disclosure is not limited to the embodiments. A variety of modifications of the embodiment that those skilled in the art conceive and an embodiment formed by combining the constituent elements of different embodiments without departing from the spirit of the present disclosure may be encompassed within the scope of one or more aspects of the present disclosure.

For example, each of the vehicle control apparatuses according to the embodiments and the modification is provided in the vehicle 1 having an engine mounted therein. However, the vehicle control apparatus may be provided in a vehicle not having an engine therein, such as an electric vehicle. In this case, the vehicle control apparatus performs control to start a power unit, such as an electric motor, mounted in the vehicle.

In addition, each of the vehicle control apparatuses according to the embodiments and the modification performs authentication to start the engine of the vehicle 1. However, authentication is not limited thereto. The vehicle control apparatuses according to the embodiments and the modification may be applied to authentication for operating each of devices of the vehicle 1, such as authentication for door locking and unlocking.

Furthermore, while each of the vehicle control apparatuses according to the embodiments and the modification operates with the accessory power supply in an ON mode, the vehicle control apparatus may be configured to operate with the accessory power supply in an OFF mode. In this case, a dedicated power supply may be connected to the vehicle control apparatus.

In addition, as described above, the technology of the present disclosure may be implemented by a system, an apparatus, a method, an integrated circuit, a computer program, a computer-readable recording medium, such as a recording disk, or any selective combination thereof. Examples of the computer-readable recording medium include a nonvolatile recording medium, such as a CD-ROM.

For example, each of the processing units included in the above embodiments is typically provided in the form of a large scale integration (LSI) which is an integrated circuit. The processing units may be individually formed into one chip. Alternatively, some or all of the processing units may be integrated into one chip.

In addition, the circuit integration is not limited to LSI and may be achieved by dedicated circuitry or a general-purpose processor other than an LSI. A field programmable gate array (FPGA), which is programmable after fabrication of the LSI, or a reconfigurable processor which allows reconfiguration of connections and settings of circuit cells in LSI may be used.

According to the above-described embodiments and the modifications, each of the constituent elements may be configured by using dedicated hardware or execution of a software program suitable for the constituent element. Each of the constituent elements may be realized by a program execution unit, such as a central processing unit (CPU) or a processor, reading out and executing a software program recorded on a recording medium, such as a hard disk or a semiconductor memory.

In addition, some or all of the constituent elements may be formed from a removable integrated circuit (IC) card or a single module. The IC card or the module is a computer system formed from, for example, a microprocessor, a ROM, and a RAM. The IC card or the module may include the above-described LSI or system LSI. When the microprocessor operates in accordance with a computer program, the IC card or the module provides its function. The IC card or the module may be tamper resistant.

The vehicle control method according to the present disclosure may be implemented by a processor such as a micro processing unit (MPU) or a CPU, a circuit such as an LSI, an IC card, a single module, or the like.

Furthermore, the technology of the present disclosure may be implemented by a software program or a digital signal composed of a software program or a non-transitory computer readable recording medium having a program recorded therein. It is to be appreciated that the above-mentioned program can be distributed via a transmission medium, such as the Internet.

In addition, all the numerical values used above, such as the ordinal numbers and the quantities, are only illustrative examples for describing the technique of the present disclosure, and the present disclosure is not limited to the numerical values given. In addition, the connection relation between the constituent elements is only an illustrative example for describing the technique of the present disclosure, and the connection relation for achieving the functions of the present disclosure is not limited thereto.

Furthermore, the division into functional blocks described in the block diagrams is only illustrative, and a plurality of the functional blocks may be integrated into one functional block, and a single functional block may be divided into a plurality of functional blocks. In addition, some of the functions may be transferred to another functional block. Still furthermore, the functions of a plurality of functional blocks having similar functions may be performed by a single hardware configuration or software in parallel or in a time-division multiplexing manner.

The technology of the present disclosure is useful for a technique for increasing the security when each of devices of a vehicle is operated.

What is claimed is:

1. A vehicle control apparatus mounted in a vehicle, comprising:
    a processor; and
    a memory that stores a program,
    wherein the program causes the processor to function as:
        an acquisitor that acquires start information including detection information about a key to the vehicle and a start instruction to start an engine of the vehicle;
        a first authenticator that acquires, in accordance with the acquired start information, sensing information about a user detected by a sensor of the vehicle and information about a preregistered user corresponding to the sensing information and performs a first authentication to verify whether the detected user is the preregistered user;
        a second authenticator that acquires, in accordance with the acquired start information, authentication information input by the user and preregistered authentication information corresponding to the authentication information and performs a second authentication to verify whether the input authentication information is the same as the preregistered authentication information, wherein the second authentication is performed after the first authentication fails; and
        a control information outputter that outputs control information regarding start of the engine on a basis of at least one of a result of authentication performed by the first authenticator and a result of authentication performed by the second authenticator.

2. The vehicle control apparatus according to claim 1, further comprising:
    a first storage that stores the information about a preregistered user corresponding to the sensing information; and
    a second storage that stores the preregistered authentication information corresponding to the authentication information,
    wherein the first authenticator acquires the information about the preregistered user from the first storage, and the second authenticator acquires the preregistered authentication information from the second storage.

3. The vehicle control apparatus according to claim 1, wherein the control information outputter outputs the control information to start the engine if at least one of authentication performed by the first authenticator and authentication performed by the second authenticator is successful.

4. The vehicle control apparatus according to claim 1, wherein the start instruction indicates that an accessory power supply of the vehicle is in an on mode.

5. The vehicle control apparatus according to claim 1, wherein the start instruction indicates that a user is sitting on a driver's seat of the vehicle.

6. The vehicle control apparatus according to claim 1, wherein the program further causes the processor to function as:
    a first authentication presentator that presents that the first authentication by the first authenticator is performed; and
    a second authentication presentator that presents that the second authentication by the second authenticator is performed.

7. The vehicle control apparatus according to claim 1, wherein the first authenticator acquires voice of a user input via a microphone of the vehicle as the sensing information, acquires voice information of the preregistered user as the information about the preregistered user, and performs, as the first authentication, authentication to verify whether the user who uttered the voice is a preregistered user on a basis of similarity between the voice and the voice information.

8. The vehicle control apparatus according to claim 7, wherein the first authenticator performs, as the first authentication, authentication to verify whether the user who uttered the voice is a preregistered user on a basis of a degree of coincidence between text acquired by speech-recognizing the voice and text included in the voice information about the preregistered user.

9. The vehicle control apparatus according to claim 7, wherein the first authenticator performs, as the first authentication, the authentication to verify whether the user who uttered the voice is a preregistered user on a basis of similarity between a feature acquired from the voice and a feature of voice included in the voice information about the preregistered user.

10. The vehicle control apparatus according to claim 7, wherein the first authenticator performs, as the first authentication, a third authentication to verify whether the user who uttered the voice is a preregistered user based on the degree of coincidence between text acquired by speech-recognizing the voice and text included in the voice information of the preregistered user and a fourth authentication to verify whether the user who uttered the voice is a preregistered user based on the similarity between a feature acquired from the voice and a feature of voice included in the voice information of the preregistered user, and wherein when both of the third authentication and the fourth authentication are successful, the first authenticator authenticates that the user who uttered the voice is a preregistered user.

11. The vehicle control apparatus according to claim 1, wherein the program further causes the processor to function as:
an identificator that acquires voice of a user input via a microphone of the vehicle and identifies whether the user who uttered the voice falls in an elderly group; and
a supporter that outputs information used to support a user in the elderly group with a driving operation in accordance with a result of the identification performed by the identificator.

12. A vehicle control method used in a vehicle control apparatus, the method causing a processor of the vehicle control apparatus to execute a process comprising:
acquiring start information including detection information about a key to a vehicle and a start instruction to start an engine of the vehicle;
acquiring, in accordance with the acquired start information, sensing information about a user detected by a sensor of the vehicle and information about a preregistered user corresponding to the sensing information;
performing a first authentication to verify whether the detected user is the preregistered user;
acquiring, in accordance with the acquired start information, authentication information input by the user and preregistered authentication information corresponding to the authentication information;
performing a second authentication to verify whether the input authentication information is the same as the preregistered authentication information, wherein the second authentication is performed after the first authentication fails; and
outputting control information regarding start of the engine on a basis of at least one of a result of the first authentication and a result of the second authentication.

13. A non-transitory recording medium storing a program that causes a computer to perform a process, the process comprising:
acquiring start information including detection information about a key to a vehicle and a start instruction to start an engine of the vehicle;
acquiring, in accordance with the acquired start information, sensing information about a user detected by a sensor of the vehicle and information about a preregistered user corresponding to the sensing information;
performing a first authentication to verify whether the detected user is the preregistered user;
acquiring, in accordance with the acquired start information, authentication information input by the user and preregistered authentication information corresponding to the authentication information;
performing a second authentication to verify whether the input authentication information is the same as the preregistered authentication information, wherein the second authentication is performed after the first authentication fails; and
outputting control information regarding start of the engine on a basis of at least one of a result of the first authentication and a result of the second authentication.

* * * * *